US008708849B2

(12) United States Patent
Young

(10) Patent No.: US 8,708,849 B2
(45) Date of Patent: Apr. 29, 2014

(54) INVERTED TOOTH CHAIN SPROCKET WITH FREQUENCY MODULATED MESHING FEATURES

(75) Inventor: James D. Young, Chesaning, MI (US)

(73) Assignee: Cloyes Gear and Products, Inc., Fort Smith, AR (US)

(\*) Notice: Subject to any disclaimer, the term of this patent is extended or adjusted under 35 U.S.C. 154(b) by 189 days.

(21) Appl. No.: 13/081,283

(22) Filed: Apr. 6, 2011

(65) Prior Publication Data
US 2011/0245002 A1 Oct. 6, 2011

Related U.S. Application Data

(60) Provisional application No. 61/321,245, filed on Apr. 6, 2010.

(51) Int. Cl.
*F16H 55/30* (2006.01)

(52) U.S. Cl.
USPC .......................................................... 474/152

(58) Field of Classification Search
USPC .......................................................... 474/152
See application file for complete search history.

(56) References Cited

U.S. PATENT DOCUMENTS

| 3,377,875 | A |   | 4/1968  | Sand              |         |
|-----------|---|---|---------|-------------------|---------|
| 3,495,468 | A |   | 2/1970  | Griffel           |         |
| 4,168,634 | A |   | 9/1979  | Griffel           |         |
| 4,509,323 | A |   | 4/1985  | Ledvina et al.    |         |
| 4,758,209 | A |   | 7/1988  | Ledvina           |         |
| 4,832,668 | A | * | 5/1989  | Ledvina et al.    | 474/155 |
| 4,915,676 | A | * | 4/1990  | Komeya            | 474/213 |
| 4,976,045 | A | * | 12/1990 | Schley            | 33/537  |
| 5,154,674 | A | * | 10/1992 | Avramidis et al.  | 474/214 |

(Continued)

FOREIGN PATENT DOCUMENTS

EP  0 092 900       11/1983
EP  1 235 003 A1    8/2002

(Continued)

OTHER PUBLICATIONS

International Preliminary Report on Patentability mailed Oct. 18, 2012 for International application No. PCT/US2011/031415.

(Continued)

*Primary Examiner* — William A Rivera
*Assistant Examiner* — Henry Liu
(74) *Attorney, Agent, or Firm* — Fay Sharpe LLP

(57) ABSTRACT

A sprocket for an inside flank engagement inverted tooth chain includes tooth spaces each defined at least partially by the engaging flank of one tooth, the disengaging flank of another tooth, and a root surface that is located between the engaging flank and the disengaging flank of the tooth space. The engaging flank of each tooth space is defined as a mirror image of the disengaging flank of each tooth space relative to a tooth space centerline such that each tooth space is symmetrically defined about its tooth space centerline. The sprocket teeth include Type A Standard Teeth, Type B Standard Teeth, Type A Relieved Teeth, and Type B Relieved Teeth. The engaging flank of each Type A Relieved Tooth and both the engaging and disengaging flanks of each Type B Relieved Tooth are relieved or negatively offset. The root surface preceding a Type A Relieved Tooth or a Type B Relieved Tooth is raised so as to be located radially outward as compared the root surface preceding a Type A Standard Tooth or a Type B Standard Tooth.

16 Claims, 17 Drawing Sheets

(56) References Cited

U.S. PATENT DOCUMENTS

| | | | |
|---|---|---|---|
| 5,236,400 A * | 8/1993 | Tsuyama | 474/217 |
| 5,267,910 A * | 12/1993 | Maruyama et al. | 474/212 |
| 5,453,059 A * | 9/1995 | Avramidis et al. | 474/212 |
| 5,628,702 A * | 5/1997 | Kotera | 474/213 |
| 5,921,879 A * | 7/1999 | Young | 474/202 |
| 5,976,045 A * | 11/1999 | Young | 474/160 |
| 5,997,424 A * | 12/1999 | Young | 474/156 |
| 6,090,003 A * | 7/2000 | Young | 474/160 |
| 6,179,741 B1 * | 1/2001 | Young | 474/161 |
| 6,325,734 B1 * | 12/2001 | Young | 474/202 |
| 6,325,735 B1 * | 12/2001 | Kanehira et al. | 474/212 |
| 6,371,875 B2 * | 4/2002 | Young | 474/161 |
| 6,413,180 B1 * | 7/2002 | Kanehira et al. | 474/164 |
| 6,416,436 B1 * | 7/2002 | Kanehira et al. | 474/212 |
| 6,461,263 B2 * | 10/2002 | Suzuki et al. | 474/213 |
| 6,533,107 B2 * | 3/2003 | Suzuki et al. | 198/834 |
| 6,663,522 B2 * | 12/2003 | Horie | 474/212 |
| 7,416,500 B2 * | 8/2008 | Young et al. | 474/202 |
| 2001/0007842 A1 | 7/2001 | Suzuki et al. | |
| 2002/0045504 A1 | 4/2002 | Suzuki et al. | |
| 2002/0058561 A1* | 5/2002 | Kanehira et al. | 474/213 |
| 2002/0128101 A1* | 9/2002 | Baddaria | 474/156 |
| 2003/0027675 A1 | 2/2003 | Suzuki et al. | |
| 2004/0166978 A1* | 8/2004 | Matsuda et al. | 474/212 |
| 2006/0058141 A1* | 3/2006 | Young | 474/213 |
| 2006/0068959 A1* | 3/2006 | Young et al. | 474/212 |
| 2007/0155564 A1 | 7/2007 | Ledvina et al. | |
| 2008/0167151 A1 | 7/2008 | Yonehara et al. | |
| 2008/0312017 A1 | 12/2008 | Young et al. | |

FOREIGN PATENT DOCUMENTS

| | | |
|---|---|---|
| EP | 1 281 890 A2 | 2/2003 |
| EP | 1 426 655 A2 | 3/2005 |
| EP | 1 426 655 A3 | 3/2005 |
| JP | 55-024203 | 2/1980 |
| JP | 56-150655 | 11/1981 |
| JP | S58-196347 | 11/1983 |

OTHER PUBLICATIONS

Young, "Inverted Tooth Chain Sprocket with Frequency-Modulated Meshing Features to Reduce Camshaft Drive Noise", SAE Technical Paper Series, 2007-01-2297, May 2007.

SAE Technical Paper Series, 1999-01-1226, Wada, Masakazu et al., "Development of a Small Pitch Silent Chain for a Single-Stage Cam Drive System", Mar. 1999.

Huang, Chintien et al., "The Tooth Contact Analysis of Round Pin Jointed Silent Chains", ASME 2005 International Design Engineering Technical Conferences & Computers and Information in Engineering Conference, DETC2005-84065, Sep. 2005.

Bucknor, Norman Kenneth, "Kinematic and static force analysis of silent chain drives", Columbia University, 1991.

International Search Report mailed May 30, 2011 for International application No. PCT/US2011/031415.

* cited by examiner

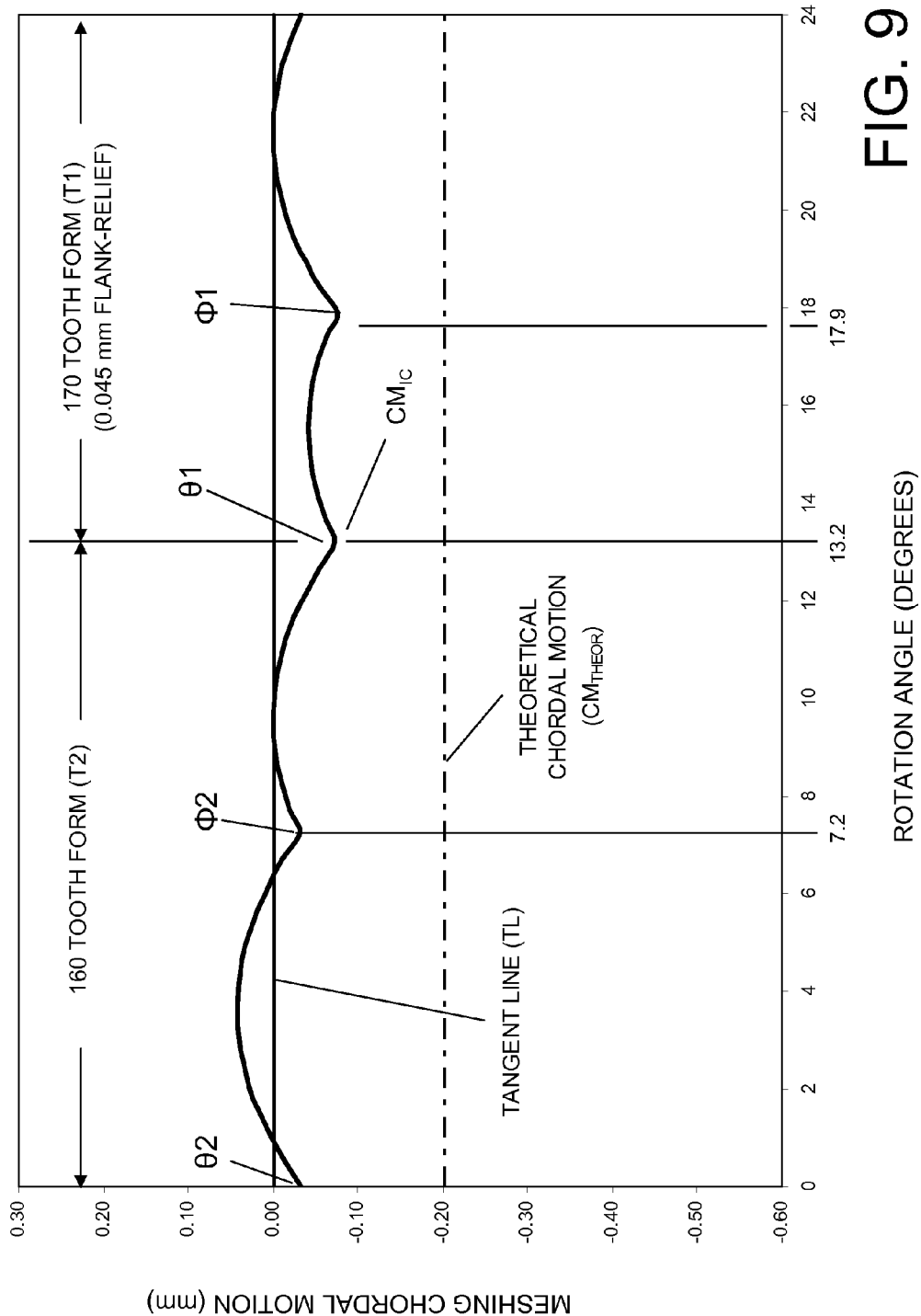

INVERTED TOOTH CHAIN SPROCKET WITH FREQUENCY MODULATED MESHING FEATURES

CROSS-REFERENCE TO RELATED APPLICATION

This application claims priority from and benefit of the filing date of U.S. provisional application Ser. No. 61/321,245 filed Apr. 6, 2010, and the entire disclosure of said provisional application is hereby incorporated by reference into the present specification.

BACKGROUND

The impact resulting during the chain-sprocket meshing phenomena has long been recognized as a dominant noise source associated with automotive engine chain drive systems and this impact occurs as the chain links leave the span and collide with the sprocket teeth during engagement. An inverted tooth chain structured for inside flank engagement will begin the meshing cycle with a sprocket tooth at the instant of initial meshing contact as the leading inside flanks of a link row impact with the engaging flank of the tooth and it ends at the instant of outside flank meshing impact with the same tooth as the forward link row articulates into its chordal seated position in the sprocket wrap. The sprocket tooth meshing cycle will therefore involve adjacent link rows and the cycle begins at the initial meshing contact angle $\theta$ and it ends at the full meshing engagement contact angle $\phi$. The initial inside flank chain-sprocket meshing impact is the major noise contributor during the meshing phenomena with the secondary meshing impact during the transition to outside flank meshing also contributing to the overall noise level, albeit to a lesser degree. The meshing impacts are repeated with a frequency generally equal to that of the frequency of the chain meshing with the sprocket. It is known that chain drive noise levels can be effectively reduced by modulating the meshing frequency and this can be achieved in various ways—but always by altering the rhythm of the chain-sprocket meshing impacts.

SUMMARY

In accordance with one exemplary embodiment, a sprocket includes a body comprising a plurality of teeth defined relative to a respective tooth centers. The tooth centers are spaced evenly in a circumferential arrangement. Each of the plurality of teeth includes an engaging flank and a disengaging flank. Each pair of circumferentially successive teeth of said plurality of teeth are separated from each other by respective tooth spaces, and each of the tooth spaces is defined at least partially by the engaging flank of one of said circumferentially successive teeth, the disengaging flank of the other of said circumferentially successive teeth, and a root surface that is located between the engaging flank and the disengaging flank of the tooth space. The engaging flank of each tooth space is defined as a mirror image of the disengaging flank of each tooth space relative to a tooth space centerline that bisects said tooth space such that each tooth space is symmetrically defined about its tooth space centerline. The plurality of teeth comprise Type A Standard Teeth, Type B Standard Teeth, Type A Relieved Teeth, and Type B Relieved Teeth, wherein:

for each of the Type A Standard Teeth, the engaging flank and the disengaging flank thereof are defined with a non-relieved full material flank;

for each of the Type B Standard Teeth, the engaging flank and the disengaging flank thereof are defined asymmetrically relative to each other about the tooth center, with the engaging flank thereof defined by a non-relieved full material flank and the disengaging flank thereof defined by a flank-relieved flank that is negatively offset relative to the tooth center as compared to the non-relieved full material flank of the disengaging flank of each of the Type A Standard Teeth;

for each of the Type A Relieved Teeth, the engaging flank and the disengaging flank thereof are defined asymmetrically relative to each other about the tooth center, with the disengaging flank thereof defined by a non-relieved full material flank and the engaging flank thereof defined with a flank-relieved flank that is negatively offset relative to the tooth center as compared to the non-relieved full material flank of the engaging flank of each of the Type A Standard Teeth;

for each of the Type B Relieved Teeth, the engaging flank and the disengaging flank thereof are each defined with a flank-relieved material flank that is negatively offset relative to the tooth center as compared to the non-relieved full material flank of said engaging flank and the disengaging flank, respectively, of each of the Type A Standard Teeth.

In accordance with another aspect of the present development, an inverted tooth chain drive system includes a sprocket adapted to mesh with an associated inside flank engagement inverted tooth chain. The sprocket includes a plurality of teeth defined relative to respective tooth centers. The tooth centers are spaced evenly in a circumferential arrangement about the axis of rotation, each tooth comprising an engaging flank and a disengaging flank. An inverted tooth chain is engaged with the sprocket and includes a plurality of rows of links each structured for inside flank engagement with the sprocket, with leading inside flanks of each row of links projecting outwardly relative to the trailing outside flanks of a preceding row of links. The leading inside flanks of each row are positioned to make initial meshing contact with the engaging flank of one of the sprocket teeth. At least some of the sprocket teeth are standard teeth and other teeth are flank-relieved teeth, and it is the engaging flank that defines whether a tooth is standard or flank-relieved (i.e., a tooth is deemed to be a standard tooth if its engaging flank is standard (not relieved), and a tooth is deemed to be a flank-relieved tooth if its engaging flank is relieved as compared to a standard engaging flank). The engaging flank of a first tooth and the disengaging flank of a second adjacent tooth sharing the same tooth space are flank-relieved and the disengaging flank of the second tooth is a mirror image of the engaging flank of the first tooth. The engaging flanks of the flank-relieved teeth are negatively offset relative to their respective tooth centers as compared to the engaging flanks of the standard teeth relative to their respective tooth centers. The root surface located forward of a flank-relieved tooth is raised (located radially outward) relative to the root surface forward of a standard tooth.

In accordance with another aspect of the present development, the flank-relieved teeth will be incorporated into the full complement of sprocket teeth of the sprocket in random (irregular) or fixed patterns, including repeating patterns, in order to stagger or modulate the meshing impacts between the chain and sprocket teeth.

Each tooth space of the sprocket that is partially defined by a flank-relieved engaging flank is symmetrically defined about a tooth space centerline which permits the sprocket to be bi-directional, i.e., when rotated in either direction, a desired frequency modulation of the meshing impacts will function in substantially the same manner.

In accordance with another aspect of the present development, a preferred minimum and maximum flank offset range is defined. The smallest flank-relief offset will be of a magnitude to modulate the initial meshing impacts by 0.5 degrees of sprocket rotation, and the maximum flank-relief offset will be determined as a function of limiting the chordal motion at initial meshing contact as measured from the tangent line, with the limiting value for actual chordal motion to be defined as 0.75 $CM_{THEOR}$ where $CM_{THEOR}$ is the maximum theoretical chordal motion.

In accordance with another aspect of the present development, the flank-relieved teeth will not all have the same amount of offset.

In accordance with another aspect of the present development, some or all of the flank-relieved teeth may have a pressure angle that is different than the pressure angle of the conventional teeth that do not have flank-relief.

BRIEF DESCRIPTION OF DRAWINGS

The invention comprises various components and arrangements of components, preferred embodiments of which are illustrated in the accompanying drawings wherein:

FIG. 9 graphically illustrates the meshing dynamics of FIGS. 5A, 5B, 6A, 6B in terms of meshing impacts and chordal motion of the meshing chain link row versus sprocket angular rotation.

DETAILED DESCRIPTION OF THE INVENTION

Figure 1:
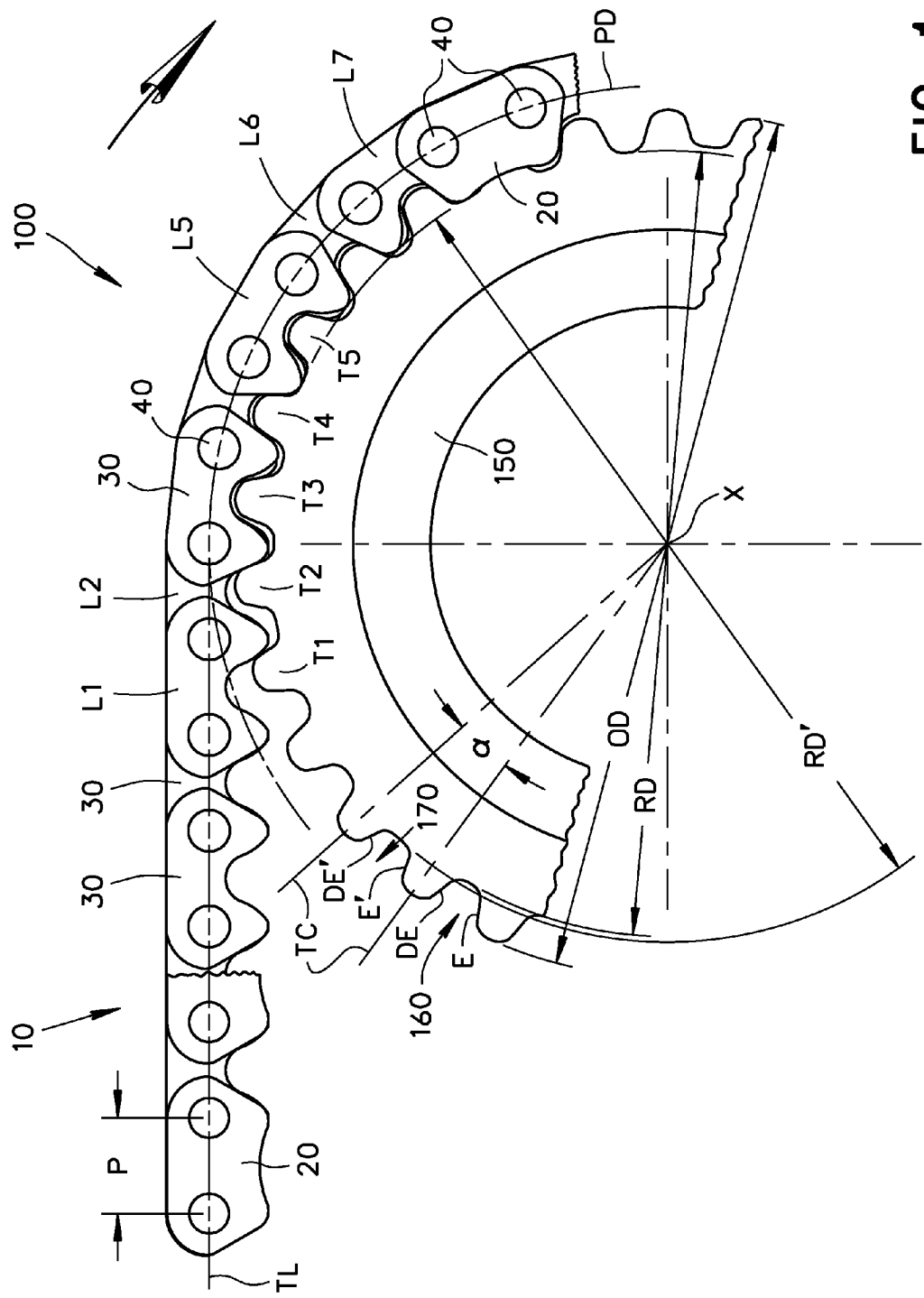
FIG. 1 is a partial front elevational view of a chain drive system comprising a conventional inverted tooth chain (with some guide links removed for clarity) meshing with a sprocket formed in accordance with the present invention.

FIG. 1 shows an inverted tooth chain drive system 100 formed in accordance with the present development. The system 100 includes a conventional inside flank engagement style inverted tooth chain 10 meshed with a drive sprocket 150 and at least one other sprocket not shown. The sprocket rotates about an axis of rotation X, clockwise in the illustrated example. The sprocket 150 is formed in accordance with the present invention with tooth flanks having an involute form but the flanks may include a radial form instead of an involute form and/or can comprise or be defined by one or more flats without departing from the overall scope and intent of the present invention.

The sprocket 150 includes a plurality of teeth T (T1, T2, T3, etc.) each having an engaging flank (E or E') and a disengaging flank (DE or DE') located on opposites sides of a tooth center TC. For a given sprocket tooth T, its engaging flank E,E' leads its disengaging flank DE,DE' in terms of the direction of rotation of the sprocket 150. The sprocket 150 has a total of N teeth, and the tooth centers TC are spaced a degrees from each other, where α=360/N. In the case where the engaging flank E,E' and disengaging flank DE,DE' of a tooth T are symmetrically defined with respect to each other, the tooth center TC bisects the tooth T. In other cases, the tooth T will be asymmetrically defined relative to its tooth center TC. The outside diameter OD and a root diameter RD define the outer and inner radial limits of the tooth flanks.

Figure 2A:
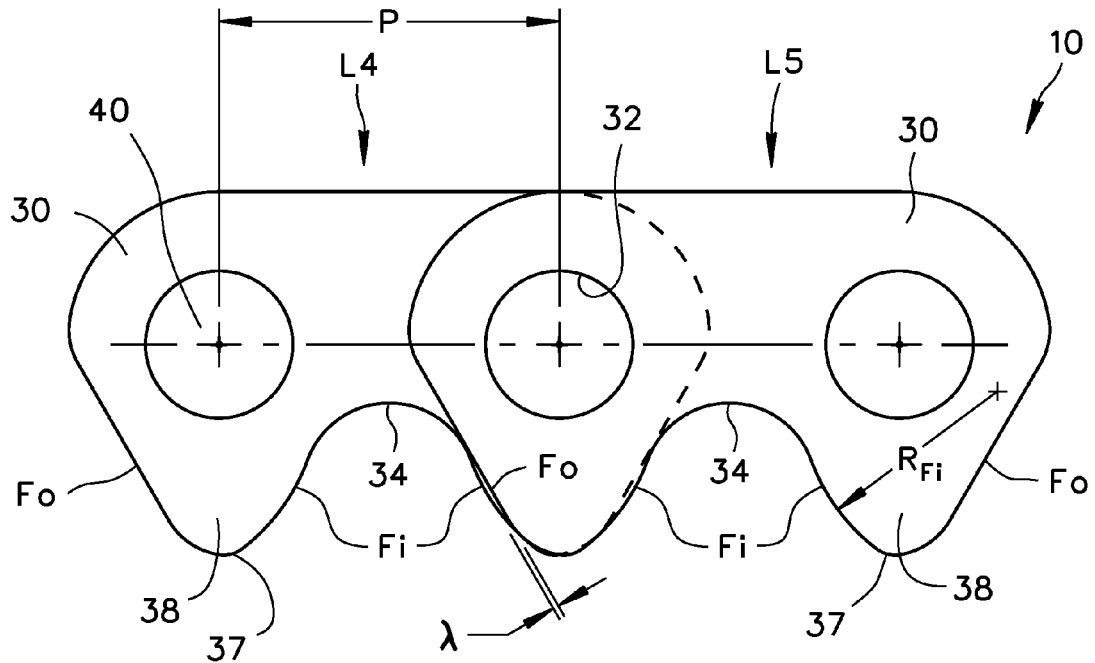
FIG. 2A is a greatly enlarged illustration of first and second rows of inside link plates of the inverted tooth chain shown in FIG. 1.
Figure 2B:
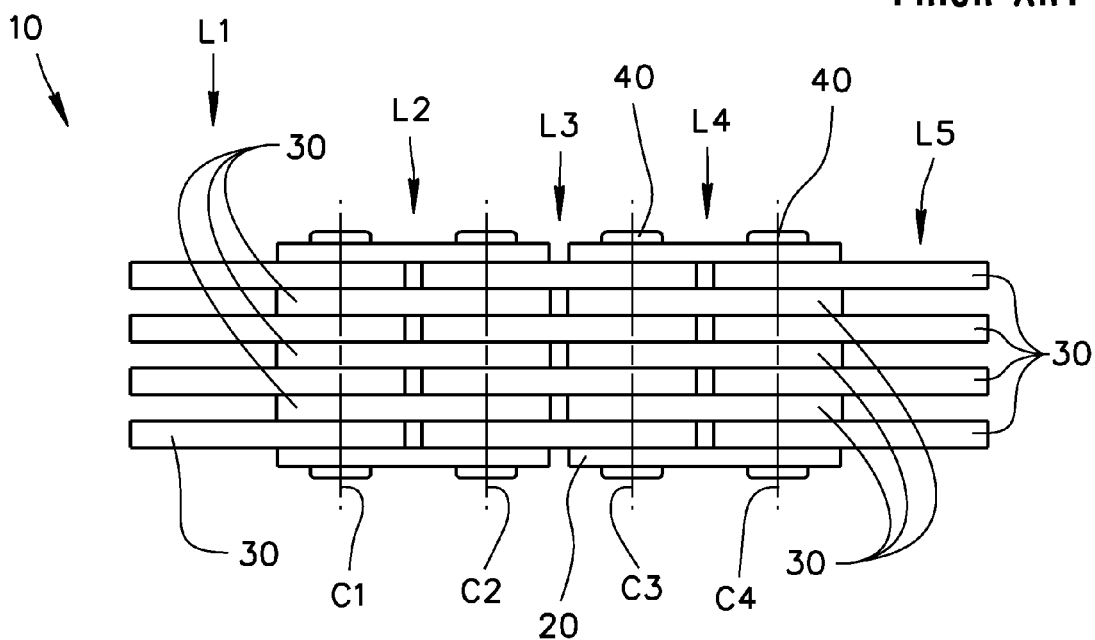
FIG. 2B is a plan view of the inverted tooth chain of FIG. 1.

FIG. 2A illustrates first and second link rows L (in particular rows L4,L5) of the chain 10 (guide links are removed to reveal the underlying inside link plates). The conventional inside link plates 30 of each row L have toes 38 which are each defined by inside flanks Fi and outside flanks Fo interconnected by a tip 37 defined by a radius and/or other surface. In the illustrated embodiment, outside flanks Fo are straight-sided and the inside flanks Fi have a convexly arcuate form and are joined by a crotch 34. In particular, the inside flanks Fi of each link 30 are defined by a radius $R_{Fi}$ that preferably blends into the tip 37 of the relevant toe 38 and into the crotch 34 at the opposite end. When the chain 10 is pulled straight as shown in FIG. 2A (it's nominal orientation as it moves into engagement with the sprocket 150 from the span during use), the inside flanks Fi project outwardly from the adjacent overlapping outside flanks Fo of preceding link row by a projection height A, thereby permitting the inside flanks Fi of a row L to make initial meshing contact with an engaging flank E,E' of a sprocket tooth T at the onset of meshing. FIG. 2B is a plan view of several rows L of the chain 10 and shows a standard chain lacing having rows L1, L2, L3, L4, L5, etc. of interleaved inside links 30, with successive rows pivotally interconnected by pivot pins 40 or rocker-type joints (the term "pin" is intended to encompass a simple pin or a rocker joint or any structure that pivotally joins successive link rows L. Other inside link lacings having stacked inside links 30 across a row are also commonly used. Each pin 40 has a pin center C with successive pin centers indicated as C1, C2, C3, etc. to distinguish them from each other. The pin centers C are spaced at chain link pitch interval P and each pin center C is defined by or coincident with an axis about which adjacent link rows L of the chain articulate relative to each other.

Referring again to FIG. 1, the chain 10 approaches the drive sprocket 150 substantially along the tangent line TL (at the centers C of the chain pins 40) in a taut strand and meshing occurs as the chain inside links 30 of rows L collide with an engaging flank E,E'. When the chain 10 moves into the wrap of the sprocket and is fully meshed with the sprocket 150, the centers of the pins 40 travel along and define a circular path referred to as the pitch diameter PD.

Figure 3B:
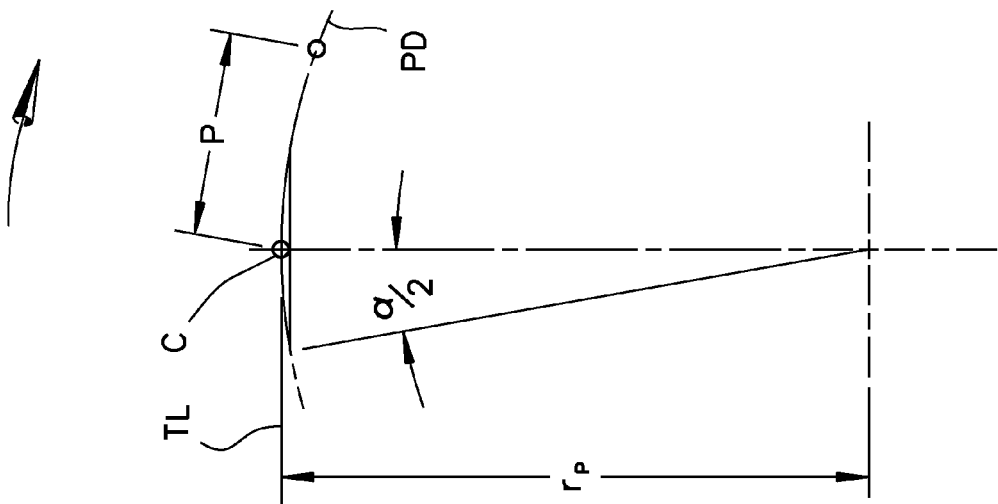
FIGS. 3A and 3B illustrate the chordal rise for a sprocket.
Figure 3A:
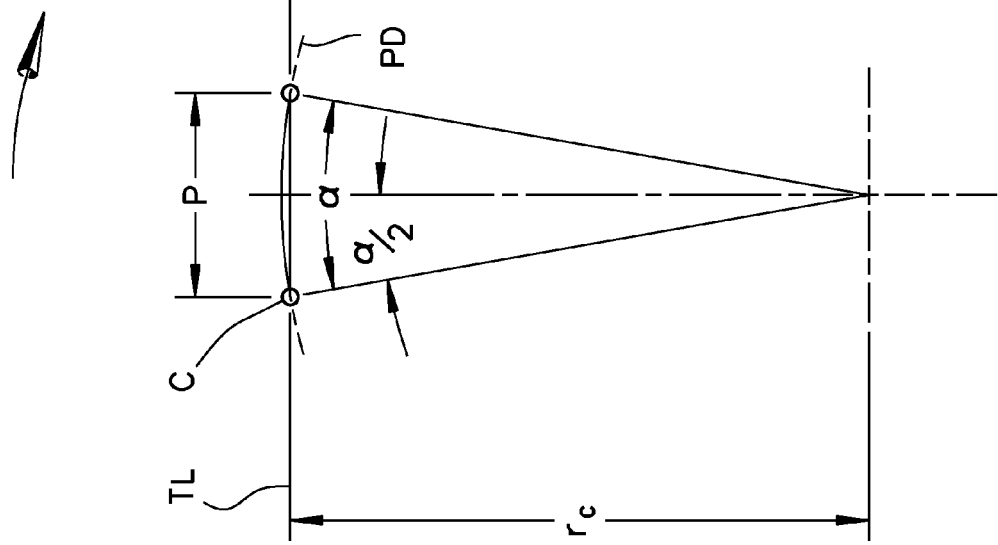

FIGS. 3A and 3B illustrate the chordal rise for a conventional sprocket in which chordal rise CR is conventionally defined as the vertical displacement of a chain pin center C (or center of another type of chain joint) as it moves through an angle α/2, where:

$$CR = r_p - r_c = r_p[1 - \cos(180°/N)]$$

and where $r_c$ is the chordal radius or the distance from the sprocket center to a sprocket pitch chord of length P, which is also equal to the chain pitch length; $r_p$ is the theoretical pitch radius of the sprocket, i.e., one-half of the pitch diameter PD; N is the number of sprocket teeth; and α is equal to the sprocket tooth angle or 360°/N. FIG. 3A shows the chain pin center C at a first position where it has just meshed with the sprocket and where it is simultaneously aligned with both the tangent line TL and the sprocket pitch diameter PD. As is known in the art, and as used herein, the tangent line TL is the theoretical straight-line path along which the meshing chain pin centers C approach the sprocket. As shown herein, the tangent line TL is located in a horizontal orientation, in which case the tangent line TL is tangent to the pitch diameter PD at the top-dead-center or 12 o'clock position on the pitch diameter PD, i.e., the tangent line TL is tangent to the pitch diameter PD at a location where a chain pin center C is centered on the pitch diameter PD and the same pin center C is also centered on a radial reference line that extends through the sprocket's axis of rotation and that is normal to the tangent line TL (the reference line being vertical when the tangent line is horizontal as shown herein). FIG. 3B illustrates the location of the same pin center C after the sprocket has rotated through the angle α/2, where it can be seen that the pin center C is transversely displaced by a distance CR as it continues its travel around the sprocket wrap, and this vertical displacement of the pin center results in a corresponding displacement of the upstream chain span and tangent line TL thereof. This transverse displacement of the chain pins C as they move through the chordal rise and fall serves to induce undesired vibration in the unsupported chain span. The chordal rise CR is alternatively referred to herein as the theoretical chordal motion $CM_{THEOR}$.

Figure 1A:
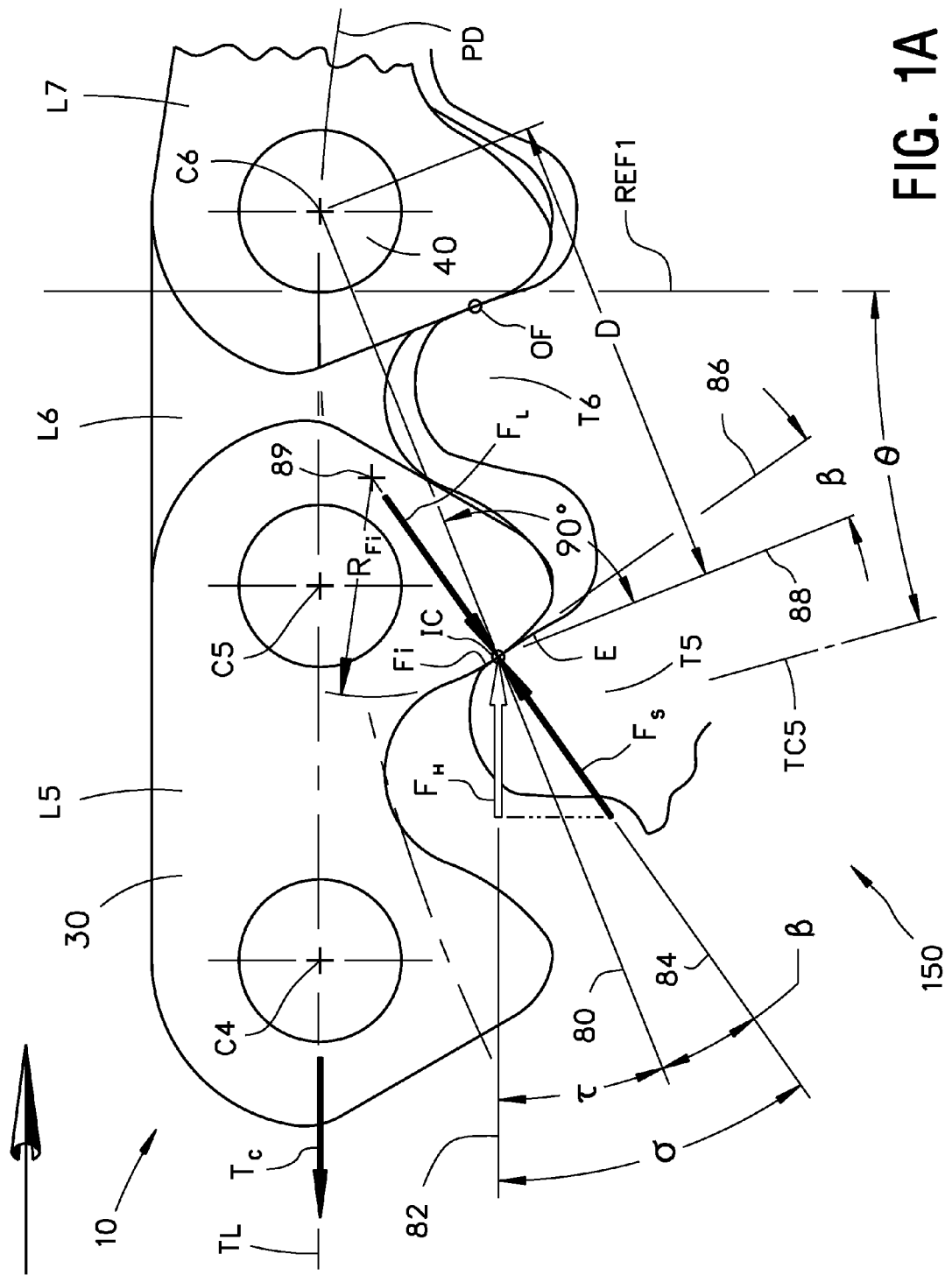
FIG. 1A is a partial enlarged view of the inverted tooth chain of FIG. 1 to illustrate the meshing geometry at the instant of initial meshing contact with the engaging flank of a conventional sprocket tooth.

As shown in FIG. 1A, a link row L5 of chain 10 is at the onset of meshing with a sprocket tooth T5 of the sprocket 150. Reference will usually be made only to the individual chain link plates 30 visible in the foreground of each row L, but those of ordinary skill in the art will recognize that the discussion applies to multiple link plates 30 across each row L. Successive pin centers C are numbered C1, C2, C3, C4, etc. to distinguish them from each other.

Figure 1B:
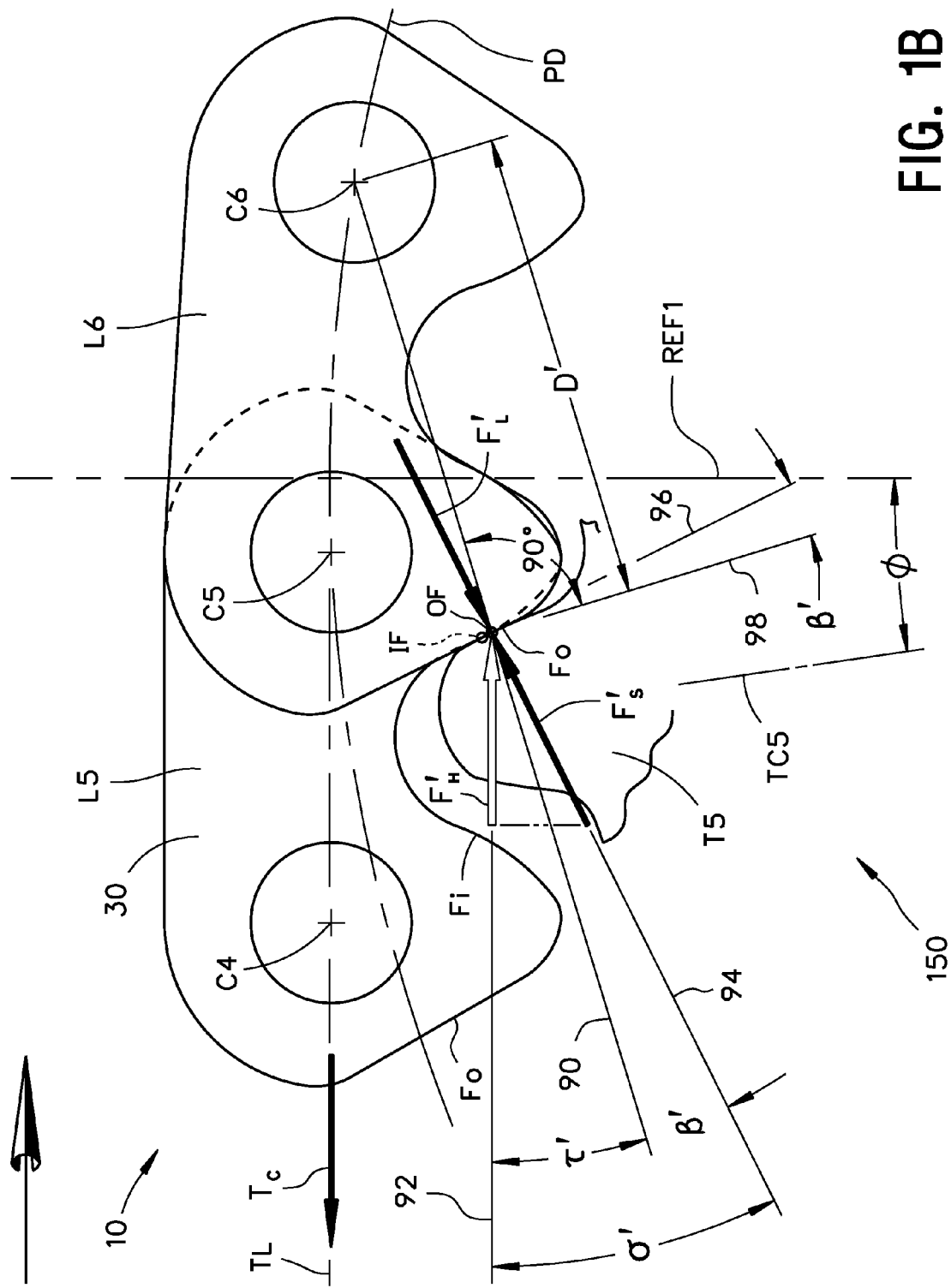
FIG. 1B is a view similar to FIG. 1A but with the sprocket rotated to a new position where the meshing chain link row is making inside flank contact and the preceding row of the chain is simultaneously making outside flank contact with the engaging flank of the first tooth, with a link plate in the foreground removed for clarity in order to more clearly show the simultaneous meshing contacts.

The link row L5 is shown at the instant of initial meshing contact with a corresponding sprocket tooth T5, i.e., at the instant of initial contact between the leading inside flank Fi of the chain link plate 30 and the engaging flank E of the sprocket tooth T5 at an initial contact location IC on the engaging flank E. Tooth T5 is referred to herein as a standard tooth because its engaging flank E is a standard form (not relieved). At this instant of initial contact IC, an initial contact angle Theta (θ) is defined between a first radial reference line REF1 originating at the axis of rotation X of the sprocket 150 and extending normal to the tangent line TL and a second radial reference line TC5 originating at the axis of rotation X and extending through the tooth center TC of the sprocket tooth T5. At this instant of initial meshing impact IC for link row L5, the preceding link row L6 exits the chain span and enters a "suspended state", i.e., the link plates 30 of row L6 are not in direct contact with the sprocket 150 and are thus suspended between the meshing row L5 and a preceding row L7 that is in full meshing contact with a preceding sprocket tooth T6. Link row L6 will remain in this suspended state until it completes its meshing cycle and transitions into a position where its trailing outside flanks Fo make full meshing contact at location OF with sprocket tooth T5 (see FIG. 1B). As shown in FIG. 1B, there is a point in the meshing cycle referred to as "simultaneous meshing contact" where successive link rows L5 and L6 are in simultaneous contact with the same sprocket tooth T5, i.e., when the leading inside flanks Fi of row L5 are still in contact with the engaging flank E at location IF at the instant when the trailing outside flanks Fo of the preceding link row L6 articulate into full meshing contact with the engaging flank E at location OF. The leading inside flanks Fi of the meshing link row L5 will then separate from the engaging flank E upon further rotation of the sprocket 150.

It should be noted that prior to the instant of initial meshing impact for link row L5 (referring again to FIG. 1A), the approaching chain span effectively rotates about pin center C6 as row L5 articulates toward meshing impact IC with the sprocket tooth T5. Thus, the pin center C6 can be referred to as the "controlling pin center." The controlling pin center C6 is the closest preceding (downstream) pin center C relative to the leading pin center C5 of the meshing link row L5 (the controlling pin center C6 is also the trailing pin center of the closest (in terms of chain travel direction) fully meshed link row L7). As such, the following relationships are defined:

the initial contact angle Theta (θ) is defined as described above;

a meshing contact angle Tau (τ) is defined between the tangent line TL and an initial contact reference line 80 that passes through both the controlling pin center C6 and the initial contact location IC;

the initial contact reference line 80 defines a length D lever arm between the controlling pin center C6 and the initial contact location IC;

a link plate entrance angle Beta (β) is defined between the initial contact reference line 80 and an inside flank reference line 84 that passes through the arc center 89 of the inside flank radius $R_{Fi}$ and the initial contact location IC (the inside flank reference line 84 will be normal to the involute curve (or radial arc segment or other curved surface) of the engaging flank E of the sprocket tooth T1;

a meshing impact angle Sigma (σ) is defined between the tangent line TL and the inside flank reference line 84, i.e., σ=τ+β.

With continuing reference to FIG. 1A, chain-sprocket meshing impact results from a velocity difference between the meshing link row L5 and a sprocket tooth T5 at the initial contact location IC, and the related impact energy $E_I$ generated as the sprocket tooth collects the meshing link row L5 from the chain span at the instant of initial meshing impact can be defined by the equation:

$$E_I = C \times m \times D^2 \times \omega^2 \times \cos^2(90-\beta)$$

where C is a constant, m is equal to the mass of the single meshing link row L5, D is the length from the controlling pin center C6 to the initial contact location IC, ω is the angular velocity of the sprocket, and β is the link plate meshing entrance angle. The meshing impacts along with the associated noise levels can be reduced by decreasing the velocity difference, which can be accomplished by reducing the meshing entrance angle β.

In addition, the impact energy $E_I$ equation considers only the mass of the meshing link row L5, and it does not take into account chain tension $T_C$ and this chain tension will add to the resultant meshing impact energy $E_I$ and the associated overall noise levels. The chain tension $T_C$ will act on the sprocket tooth T5 at the onset of meshing and the tooth impact reaction force $F_S$, equal and opposite to a link impact force $F_L$, will vary with the magnitude of the meshing impact angle σ, where:

$$F_S = \frac{F_H}{\cos\sigma}$$

and where $F_H$ will be equal to $T_C$ in order to satisfy the summation of horizontal forces being equal to zero. Note that in FIG. 1A, the meshing impact angle Sigma (σ) and its component angles are shown relative to a reference line 82 that is parallel to the tangent line TL and extending through the initial contact location IC, coincident with the force vector $F_H$). It should be noted that the sprocket tooth T5, along with the next several teeth forward (downstream) of tooth T5, share in the load distribution of the chain tension $T_C$ with the largest reaction force $F_H$ occurring at location IC of tooth T1 at the onset of initial meshing contact. The remaining portion of the chain tension loading acting on the several teeth forward of tooth T5 does not influence the meshing noise levels and is therefore not a consideration for this present development. To summarize, the link impact force vector $F_L$ acts at the meshing impact location IC during initial meshing contact and adds to the total meshing impact energy $E_I$ and the related noise levels.

FIG. 1B is similar to FIG. 1A but shows the sprocket 150 rotated further through the meshing cycle until the instant when the trailing outside flanks Fo of preceding link row L6 make contact with the engaging flank E of sprocket tooth T5 at an outside flank contact location OF while the leading inside flanks Fi of link row L5 are simultaneously contacting the engaging flank E at a location IF. As noted above, the instant at which the tooth T5 transitions from inside flank only contact with leading inside flanks Fi of link row L5 also to outside flank contact with trailing outside flanks Fo of preceding link row L6 at an outside flank contact point OF can be referred to as a "transition point," and also defines the end of the meshing cycle for the standard tooth T5, because the link row L6 is then fully meshed with both its leading and trailing pin centers C6,C5 located on the pitch diameter PD such that the link row L6 is then located in its fully meshed or seated chordal position and is considered to be in the wrap of the sprocket 150. A transition angle Phi (φ) is defined between the first radial reference line REF1 and the second radial reference line TC5 passing through the tooth center TC of tooth T5. As such, the following relationships are defined:

the transition angle Phi (φ) is defined;

a transition contact angle Tau' (τ') is defined between the tangent line TL and a transition contact reference line 90 that passes through both the outside flank contact location OF and the controlling pin center C6 which, for the transition phenomenon, is the leading pin center of the link row transitioning to trailing outside flank contact at location OF;

the transition contact reference line 90 defines a length D' lever arm between the controlling pin center C6 and outside flank contact location OF;

a link plate transition angle Beta' (β') is defined between the transition contact reference line 90 and an outside flank reference line 94 that extends normal to the trailing outside flank Fo (the outside flank reference line 94 will also be normal to the involute curve (or radial arc segment or other curved surface) of the engaging flank E of the sprocket tooth T5;

a transition impact angle Sigma' (σ') is defined between the tangent line TL and the outside flank reference line 94, wherein σ'=τ'+β'.

As shown in FIG. 1B, the resulting link plate transition angle Beta' (β') and transition impact angle Sigma' (σ') will dictate the link impact force $F'_L$ and resultant impact energy $E_I$ for the transitional impact of the trailing outside flanks Fo at location OF. It should be noted that features in FIG. 1B that correspond to features of FIG. 1A are labeled with corresponding reference characters including a prime (') designation, and not all are discussed further. The transition impact angle Sigma' (σ') and its constituents are shown relative to a reference line 92 that is parallel to the tangent line TL and extending through the outside flank contact location OF, coincident with the force vector $F'_H$. These transitional impacts of the trailing outside flanks Fo at locations OF are thought to be a less significant contributor of noise and vibration as compared to the above described initial meshing impacts of the leading inside flanks Fi at locations IC, but it is believed that controlling the transition impact angle Sigma' (σ') and its constituents, i.e., the link plate transition angle Beta' (β') and the transition contact angle Tau' (τ'), is desirable for further minimizing noise and vibration in the system 100.

Figure 4:
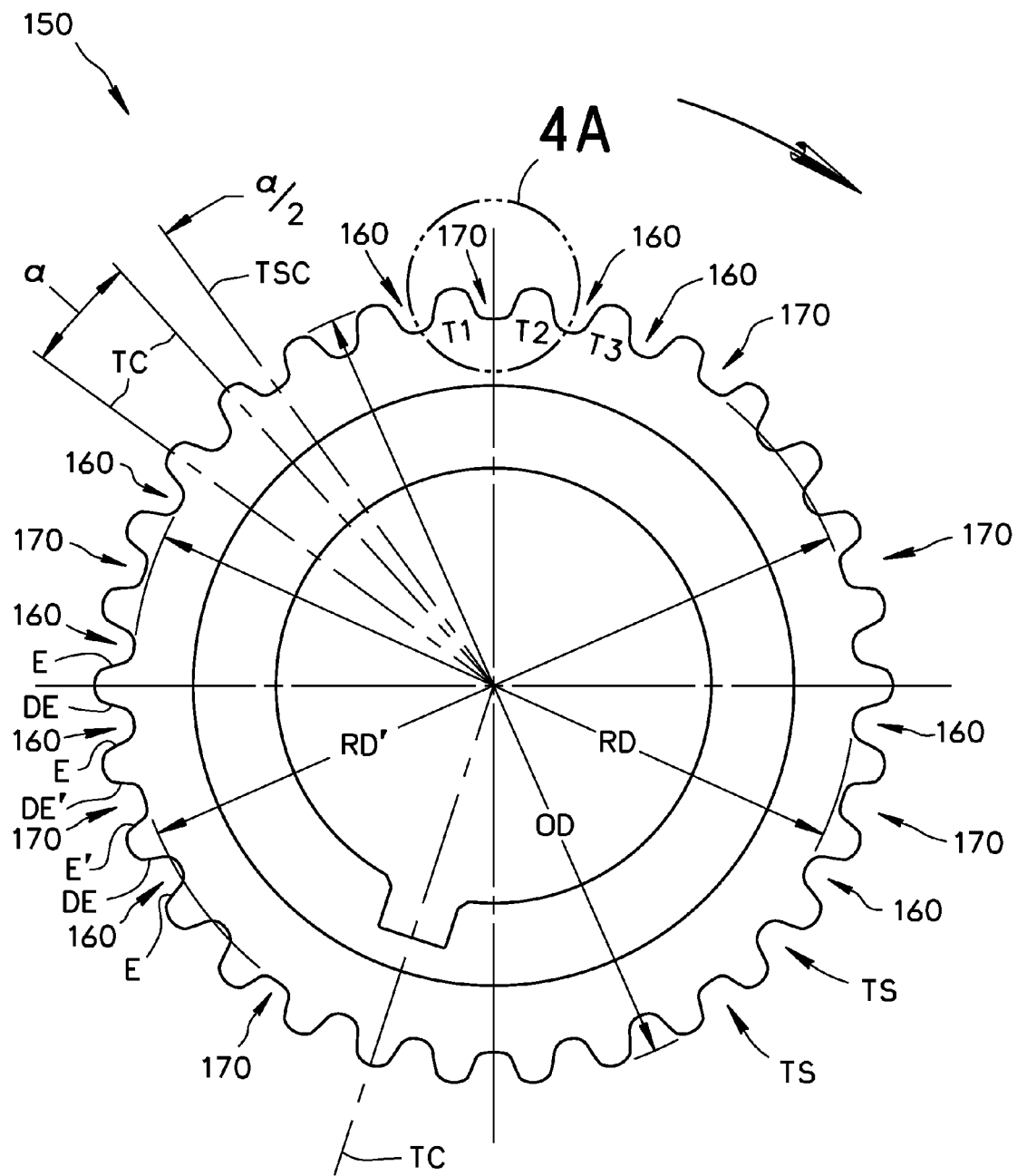
FIG. 4 is a front elevational view of the sprocket of FIG. 1 in its entirety, to illustrate a three-tooth repeating pattern.
Figure 4A:
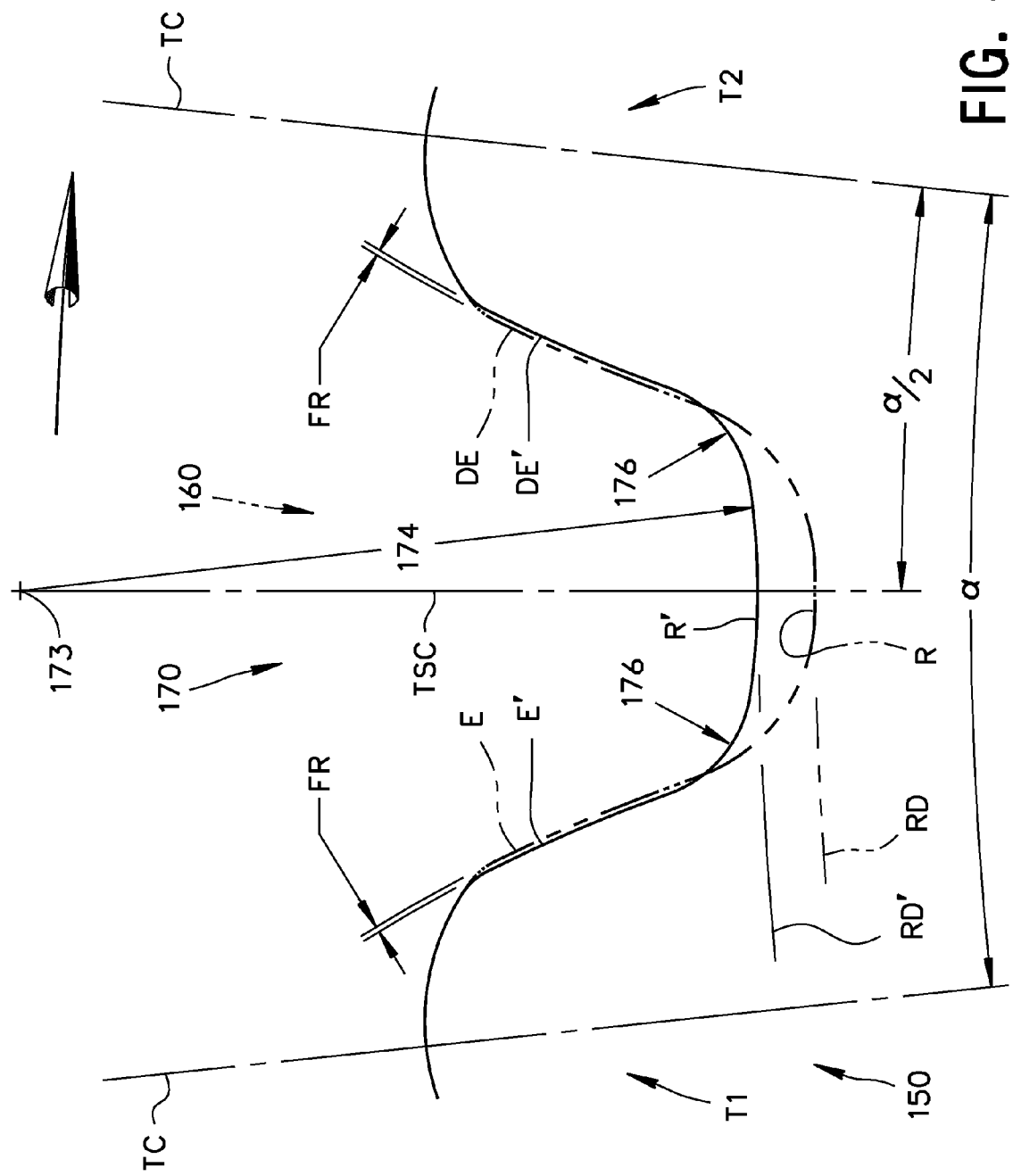
FIG. 4A is a greatly enlarged view of a flank-relieved tooth of the sprocket shown in FIG. 4, with the profile of adjacent conventional teeth shown as an overlay in phantom.

FIG. 4 is a front elevational view of the sprocket 150 of FIG. 1 in its entirety, to illustrate a three-tooth repeating pattern for teeth T1, T2, T3, which is repeated continuous around the circumference of the sprocket. Each pair of circumferentially successive teeth T (i.e., T1, T2, T3, etc.) are separated from each other by respective tooth spaces 160,170. As shown in FIG. 4A with reference to teeth T1 and T2, for any subject sprocket tooth T (T1 in FIG. 4A), the disengaging flank DE or DE' of the preceding sprocket tooth T (T2 in FIG. 4A) is shaped as a mirror image of the engaging flank E or E' of the subject sprocket tooth T relative to the tooth space centerline. The phantom lines of FIG. 4A show that if the tooth T1 is a standard sprocket tooth with a conventional or non-relieved full-material engaging flank E, the preceding tooth T2 will have a conventional or non-relieved full-material disengaging flank DE, and a standard tooth space 160 is defined about a tooth space centerline TSC that extends through the sprocket axis of rotation X and that bisects the tooth space 160. The standard tooth space 160 includes and is partially defined by a standard root surface R (also shown in phantom lines) that defines the minimum root diameter RD of the sprocket 150. Alternatively, the solid lines of FIG. 4A show that if the tooth T1 is a flank-relieved sprocket tooth with an engaging flank E' that is negatively offset or relieved relative to its tooth center TC by an amount FR, the preceding tooth T2 will likewise have a disengaging flank DE' that is negatively offset or relieved relative to its tooth center TC by the amount FR, and a relieved tooth space 170 is thus defined about the tooth space centerline TSC. The relieved tooth space 170 includes and is partially defined by a raised root surface R' (also shown in solid lines) that is raised so as to be located radially outward relative to the root surface R of a standard tooth space 160, and the raised root surface R' is symmetrically defined about the tooth space centerline TSC for reasons detailed below. As such, each tooth space 160,170 is defined at least partially by the engaging flank E,E' of one of said circumferentially successive teeth, the disengaging flank DE,DE' of the other of said circumferentially successive teeth, and a root surface R,R' that is located between the engaging flank and the disengaging flank of the tooth space. As used herein, each tooth space 160,170 is said to include or comprise the engaging flank E,E' of a first tooth T1, the disengaging flank DE,DE' of a second tooth T2 and a root surface R,R' located between the engaging flank E,E' of the first tooth T1 and the disengaging flank DE,DE' of the second tooth T2. Circumferentially successive or adjacent teeth defining each tooth space 160,170 are sometimes referred to herein as a "pair" of successive or adjacent teeth.

The above requirements for the sprocket 150 lead to each tooth T of the sprocket 150 being one of four possible different types:

Type A Standard Tooth—symmetrically defined about its tooth center TC with conventional non-relieved full material engaging and disengaging flanks E,DE;

Type B Standard Tooth—tooth is asymmetrically defined about its tooth center TC by a conventional non-relieved full material engaging flank E and a flank-relieved disengaging flank DE';

Type A Relieved Tooth—tooth is asymmetrically defined about its tooth center TC by a flank-relieved engaging flank E' and a conventional non-relieved full material disengaging flank DE;

Type B Relieved Tooth—tooth is symmetrically defined about its tooth center TC by a flank-relieved engaging flank E' and a flank-relieved disengaging flank DE'.

The term "standard" as used herein is not intended to mean conventional or prior art, it is merely used to distinguish a tooth having a full material (non-relieved) engaging flank from a tooth having a negatively offset (relieved) engaging flank. The description "negatively offset" is intended to mean that the flank-relieved flank E',DE' is defined or located closer to its tooth center TC as compared to a full material non-relieved flank E,DE.

The symmetrical relationship of at least the engaging and disengaging flanks E,DE of a standard tooth space 160, and the symmetrically relationship of the engaging and disengaging flanks E',DE' and also the root surface R' of the relieved tooth space 170 allows the sprocket 150 to be bi-directional such that it will function identically in either direction of rotation and/or with either side facing up/out for a given direction of rotation.

Figure 5A:
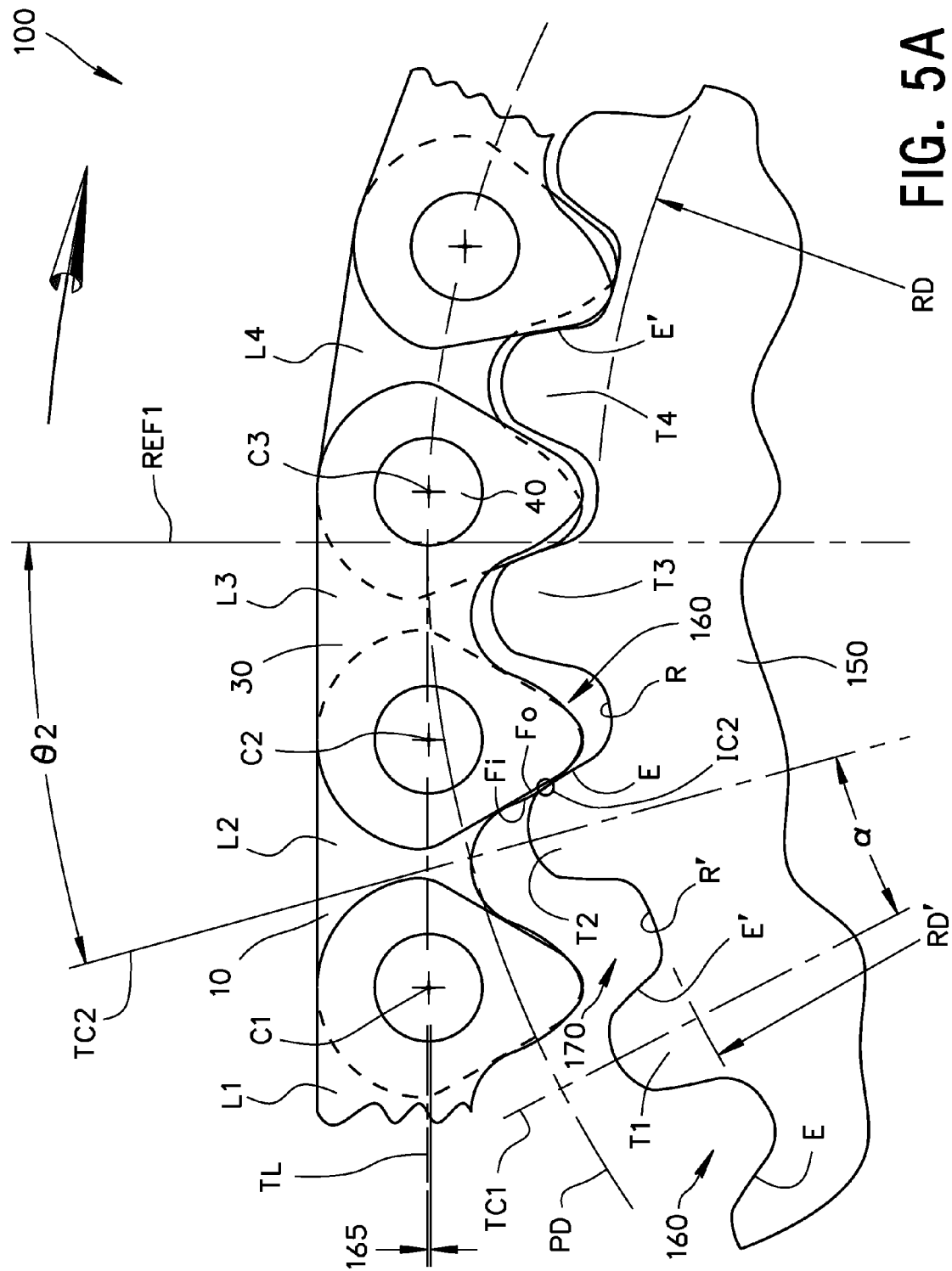
FIG. 5A is a partial enlarged view of the chain drive system of FIG. 1 showing the inverted tooth chain at the instant of initial meshing contact with the engaging flank of a conventional sprocket tooth T2.

FIG. 5A is a partial enlarged view of the chain drive system of FIG. 1 showing the inverted tooth chain at the instant of initial meshing contact with the engaging flank of a standard sprocket tooth. It can be seen that an initial contact angle θ2 is defined with respect to the meshing link row L2 and the standard tooth T2 as described above for the angle θ in relation to the meshing link row L5 and tooth T5 of FIG. 1A.

Figure 5B:
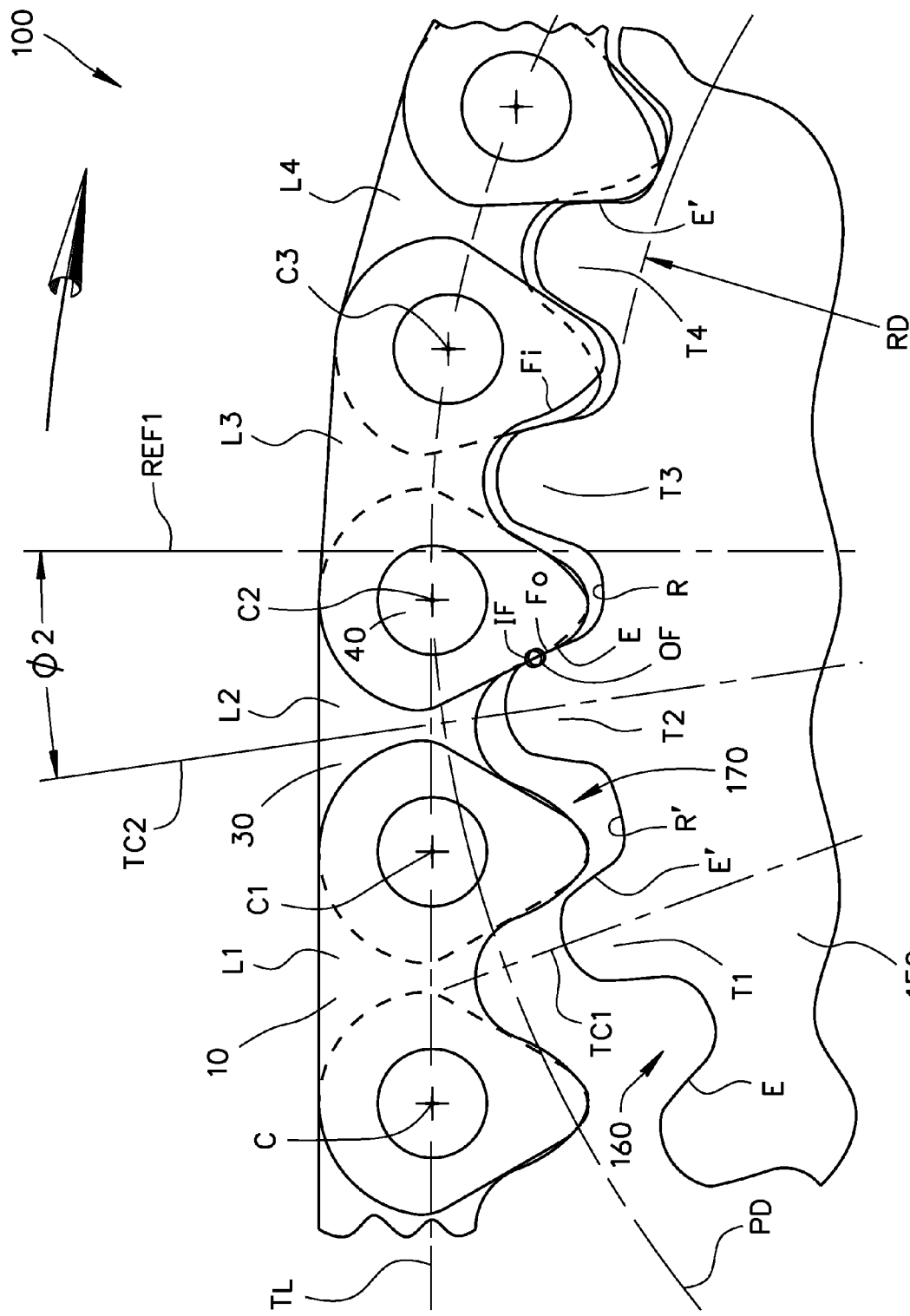
FIG. 5B is a partial front elevational view of the chain drive system of FIG. 5A with the sprocket rotated to a new position where the meshing chain link row is making inside flank contact and the preceding row of the chain is simultaneously making outside flank contact with the engaging flank of the tooth T2.

FIG. 5B shows the system of FIG. 5A with the sprocket 150 rotated to the transition point for the meshing link row L2 and standard tooth T2, where the meshing chain link row L2 is making inside flank contact IF and the preceding row L3 of the chain is simultaneously making outside flank contact OF with the engaging flank E of the standard tooth T2. The transition angle φ2 is defined with respect to the link rows L2 and L3 and the tooth T2 as described above for the angle φ in relation to the link rows L5 and L6 and tooth T5 of FIG. 1B.

Figure 6A:
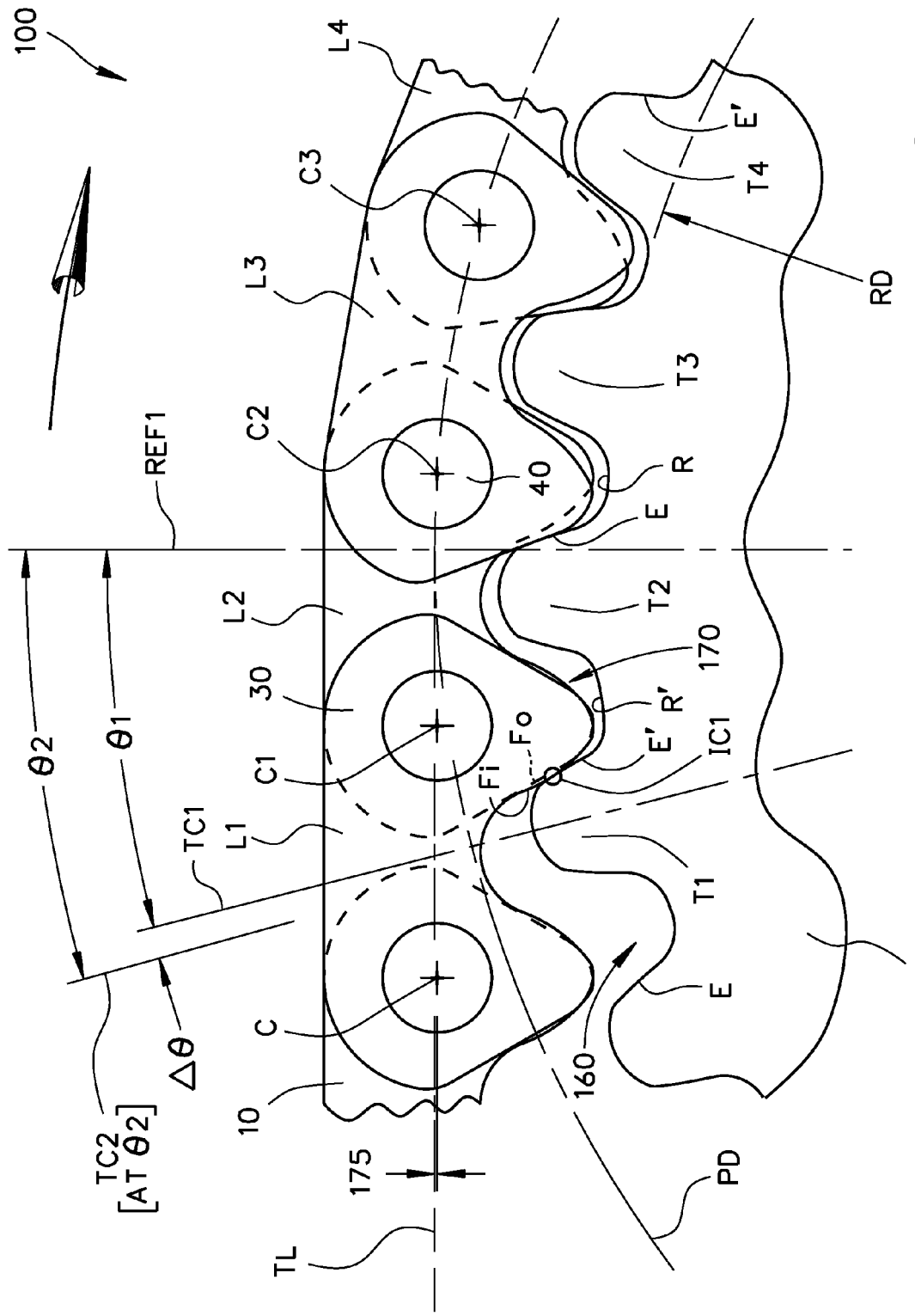
FIG. 6A is similar to FIG. 5A and shows the same sprocket and chain system, but shows the chain at the instant of initial meshing contact with a tooth T1 of the sprocket that is flank-relieved in accordance with the present invention.

FIG. 6A is similar to FIG. 5A but shows a link row L1 of the chain 10 at the instant of initial meshing contact with a flank-relieved tooth T1. An initial contact angle θ1 is defined with respect to the meshing link row L1 and the flank-relieved tooth T1. The initial contact angle θ2 from FIG. 5A is overlayed on FIG. 6A, and it can be seen that θ2>θ1 by an amount Δθ. The sprocket 150, therefore, must rotate an additional angle Δθ to establish initial meshing contact IC with flank-relieved tooth T1, which, in effect, serves to modulate the meshing frequency with respect to the standard tooth form.

Figure 6B:
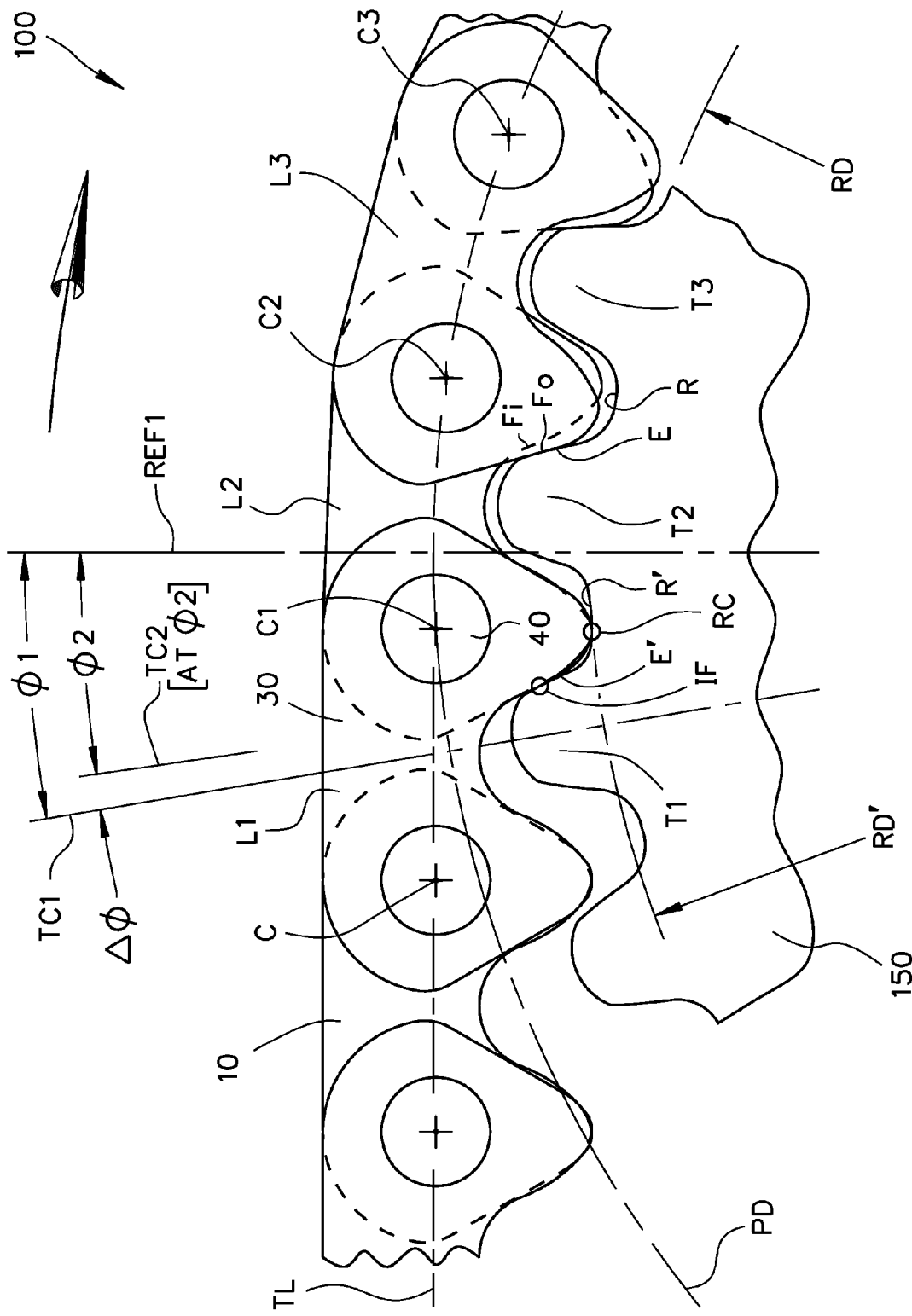
FIG. 6B is similar to FIG. 5B but shows the system of FIG. 6A with the sprocket rotated to a new position where the meshing chain link row is making inside flank contact with the tooth T1 and the preceding row of the chain is simultaneously making root contact with the tooth space root surface forward of the tooth T1.

FIG. 6B is similar to FIG. 5B but shows the sprocket 150 rotated such that the link rows L1 and L2 are at the transition point with the flank-relieved tooth T1. As such, the meshing chain link row L1 is making inside flank contact IF with the engaging flank E' and the preceding chain row L2 has simultaneously articulated into making root contact at location RC with raised root surface R'. The transition angle φ1 is defined with respect to the link rows L1 and L2 and the flank-relieved tooth T1 as described above. The transition angle φ2 from FIG. 5B is overlayed on FIG. 6B and it can be seen that φ1>φ2 by an amount Δφ. The sprocket 150, therefore, must rotate an additional angle Δφ to reach the transition point for a standard tooth T2 as compared to a flank-relieved tooth T1, which provides further modulation to the system 100.

From the above, those of ordinary skill in the art will recognize that:
a meshing link row makes initial contact IC with a flank-relieved tooth later in terms of sprocket rotation than a meshing link row makes initial contact IC with a standard tooth; and,
a meshing link row reaches the transition point with a flank-relieved tooth earlier in terms of sprocket rotation from initial contact IC than a meshing link row reaches the transition point with a standard tooth.

It should be noted that the transition point for a flank-relieved tooth such as tooth T1 is necessarily defined in a different manner than as described above for a standard tooth such as tooth T5. FIG. 6D is a greatly enlarged version of FIG. 6B, with the meshing link row L1 removed. FIG. 6D shows that because the engaging flank E' is a flank-relieved flank that is negatively offset relative to its tooth center, the trailing outside flanks Fo of the link row L2 preceding the meshing link row L1 will never make contact with the engaging flank E', and a flank clearance FC is defined between the trailing outside flanks Fo of the preceding row L2 and the engaging flank E' of the flank-relieved-tooth. For the preceding link row L2 to complete its meshing cycle and be properly positioned in the wrap, with its trailing pin center C1 located on the pitch diameter PD, the trailing toes 37 of its links 30 must make root contact with the sprocket 150 at location RC with the root surface R', which is the reason that the root surface R' located adjacent the engaging flank E' a flank-relived tooth such as tooth T1 must be raised or located radially outward as compared to the root surface R located adjacent a standard tooth such as tooth T5. Once the trailing toes 37 of the link row L2 make contact at RC with the root R', the meshing cycle for the link row L2 is complete, and both its leading and trailing pin centers C2,C1 are located on the pitch diameter PD. The transition point for a flank-relieved tooth T1 is thus defined as the first instant when the trailing toes 37 of the preceding link row L2 make root contact at location RC while the leading inside flanks Fi of the meshing link row L1 are still in contact with the engaging flank E' of the tooth T1 at a location IF, as shown in FIG. 6B. As such, the transition angle Phi ϕ1 is defined as described above, i.e., between the first radial reference line REF1 and a second radial reference line TC1 passing through the tooth center TC of meshing tooth T1.

Figure 6C:
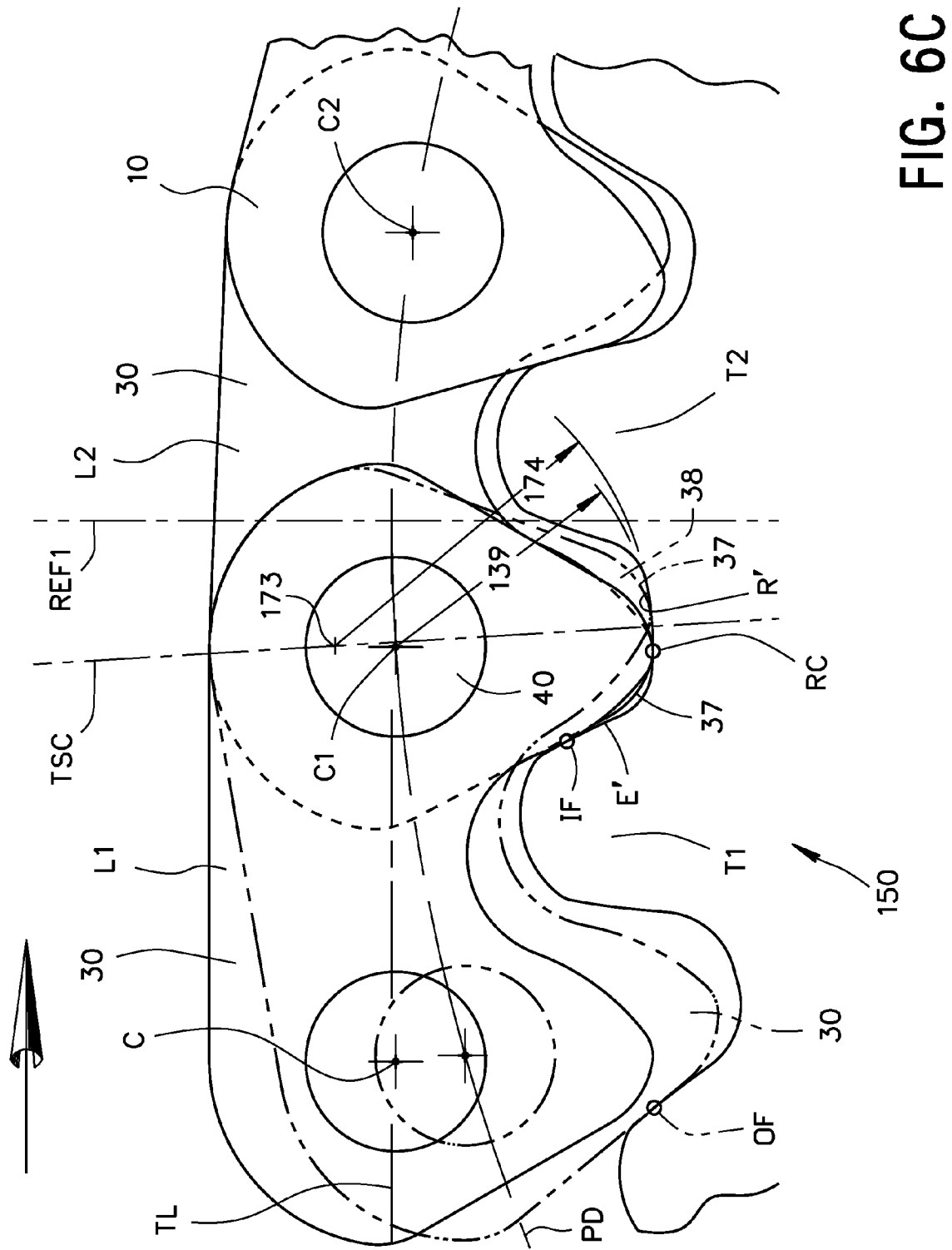
FIG. 6C is an enlarged partial front elevational view of FIG. 6B to illustrate the meshing relationship of the leading chain link toe with the sprocket tooth space root surface as the link row rotates into full engagement with the sprocket.
Figure 6D:
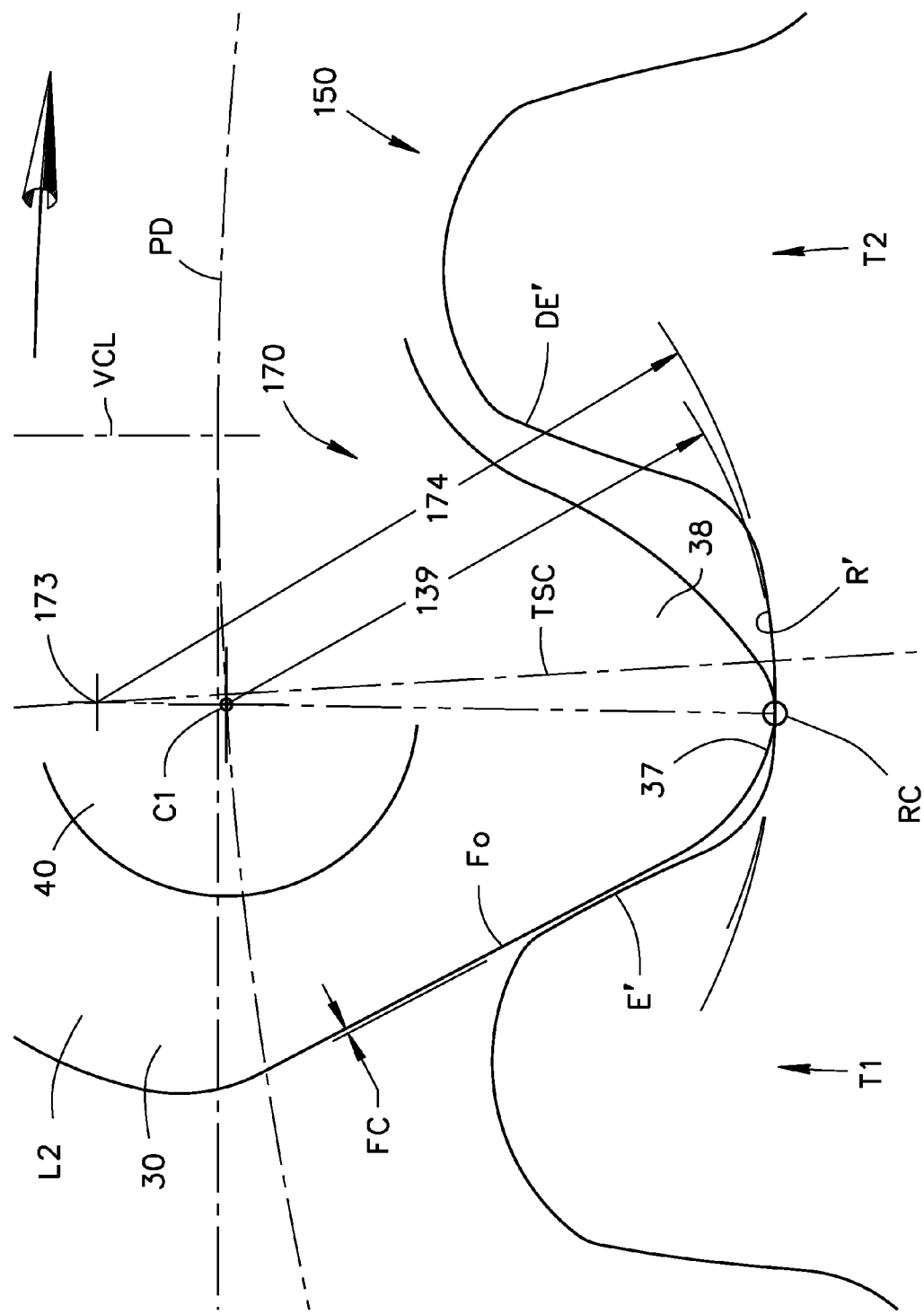
FIG. 6D is a greatly enlarged partial view of FIG. 6C showing the trailing flank link plate clearance to the engaging flank of the tooth T1 and the geometrical relationship of the root surface to the chain link toe at full meshing contact.

FIG. 6C is an enlarged partial front elevational view of FIG. 6B to illustrate the meshing relationship of the leading toes 37 of the meshing link row L1 with the raised root surface R' as the link row L1 rotates into full engagement with the sprocket after the trailing toes 37 of the preceding link row L2 make root contact at location RC with the raised root surface R'. The position of the meshing link row L1 at the transition point is shown in solid lines. The relative position of the meshing link row L1 to the root surface R' as link row L1 rotates into full engagement is shown in phantom lines. At the transition point as shown in solid lines in FIG. 6C, the leading toes 37 of the meshing link row L1 will be close to the root surface R' (just to the left of RC in FIG. 6C) and will sweep on an arc 139 centered at the pin center C1 and tangent to RC as the sprocket rotates. The pin center C1 is located on the pitch diameter PD due to the root contact at RC made between the trailing toes 37 of preceding link row L2 and the raised root surface R'. It is important that the leading toes 37 not act as a cam against the root surface R' as they move relative to the root surface R', which would undesirably move the pin center C1 outward relative to the pitch diameter PD. As such, the root surface R' is shaped as a circular arc segment defined by a radius centered at root surface arc center 173. Arc center 173 is located on the tooth space centerline TSC that bisects the tooth space. The arc center 173, pin center C1 and root contact location RC lie on a straight line (refer also to FIG. 6D), which ensures that the leading toes 37 of the meshing link row L1 will be tangent to the root surface R' at location RC as the meshing link row L1 pivots about the pin center C1 as the sprocket 150 rotates such that the sweeping movement of the leading toes 37 on the root surface R' will not force the pin center C1 radially outward relative to the pitch diameter PD. As noted above, to make the sprocket bi-directional, the root surface R' is defined symmetrically about the tooth space centerline TSC (and the engaging and disengaging flanks E', DE' of the tooth space are symmetrically defined relative to each other).

Figure 7:
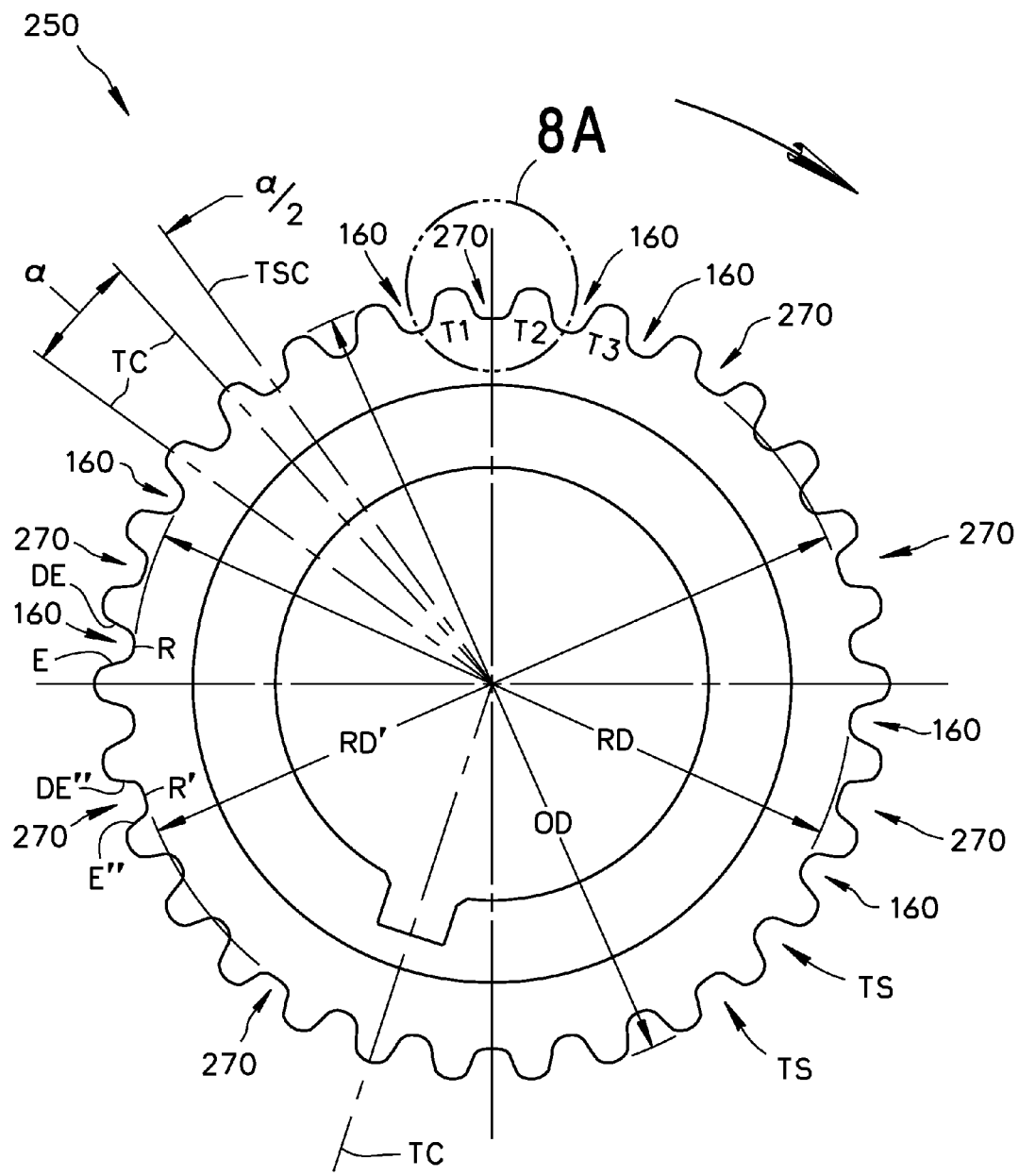
FIG. 7 is a front elevational view of a complete sprocket, in its entirety, formed in accordance with another embodiment.

FIG. 7 is a front elevational view of a sprocket 250 formed in accordance with another embodiment. Features of the sprocket 250 that are identical to the sprocket 150 are identified with identical reference characters. Modified features, as compared to the sprocket 150, are identified with corresponding reference numbers that are 100 greater than those used for the sprocket 150. The sprocket 250 includes tooth spaces 160 defined by successive standard teeth as described above. The sprocket 250 also includes tooth spaces 270 that correspond to the tooth spaces 170 described above in that the engaging and disengaging flanks thereof E" and DE" are flank-relieved. The tooth spaces 270 differ from the tooth spaces 170 described above in that the engaging flank E" and disengaging flank DE" thereof are also defined with a reduced pressure angle as compared to the engaging flank E' and disengaging flank DE' of the tooth space 170. Sprocket 250 is also bi-directional, with the engaging flanks E and disengaging flank DE of tooth spaces 160 being mirror images of each other, the engaging flank E" and disengaging flank DE" of tooth spaces 270 being mirror images of each other, and raised root surfaces R" of tooth spaces 270 being symmetrically defined about a tooth space centerline TSC. As noted above, for ease of reference, each tooth space 160,270 is said to include or comprise the engaging flank E,E" of a first tooth T1, the disengaging flank DE,DE" of a second tooth T2 and a root surface R,R" located between the engaging flank E,E" of the first tooth T1 and the disengaging flank DE,DE" of the second tooth T2.

In general terms, for a conventional sprocket, the involute form of the engaging tooth flanks and disengaging flanks is generated from a base circle and the base circle is defined as:

Base Circle=PD×COS(PA), where

PD=sprocket pitch diameter, and PA=tooth pressure angle
Furthermore, the pitch diameter PD, itself, is defined as:

PD=$P$/SIN(180/$N$), where where P=pitch, and N=number of teeth in sprocket.
The involute tooth form can be approximated by a radial tooth form, i.e. one or more circular arc segments, and the pressure angle PA of a radial tooth form can likewise be determined. In any case, it is generally known that an engaging flank defined with a smaller pressure angle is steeper (closer to a radial line originating at the sprocket axis of rotation) as compared to an engaging flank defined with a larger pressure angle. As such, for a given location on the engaging flank such as the initial contact location IC described above, a reference line tangent to the engaging flank at the initial contact location IC will define an angle between itself and a radial reference line located between the engaging flank and the immediate downstream (leading) disengaging flank that is smaller when the pressure angle is decreased and that is larger when the pressure angle is increased.

Figure 8:
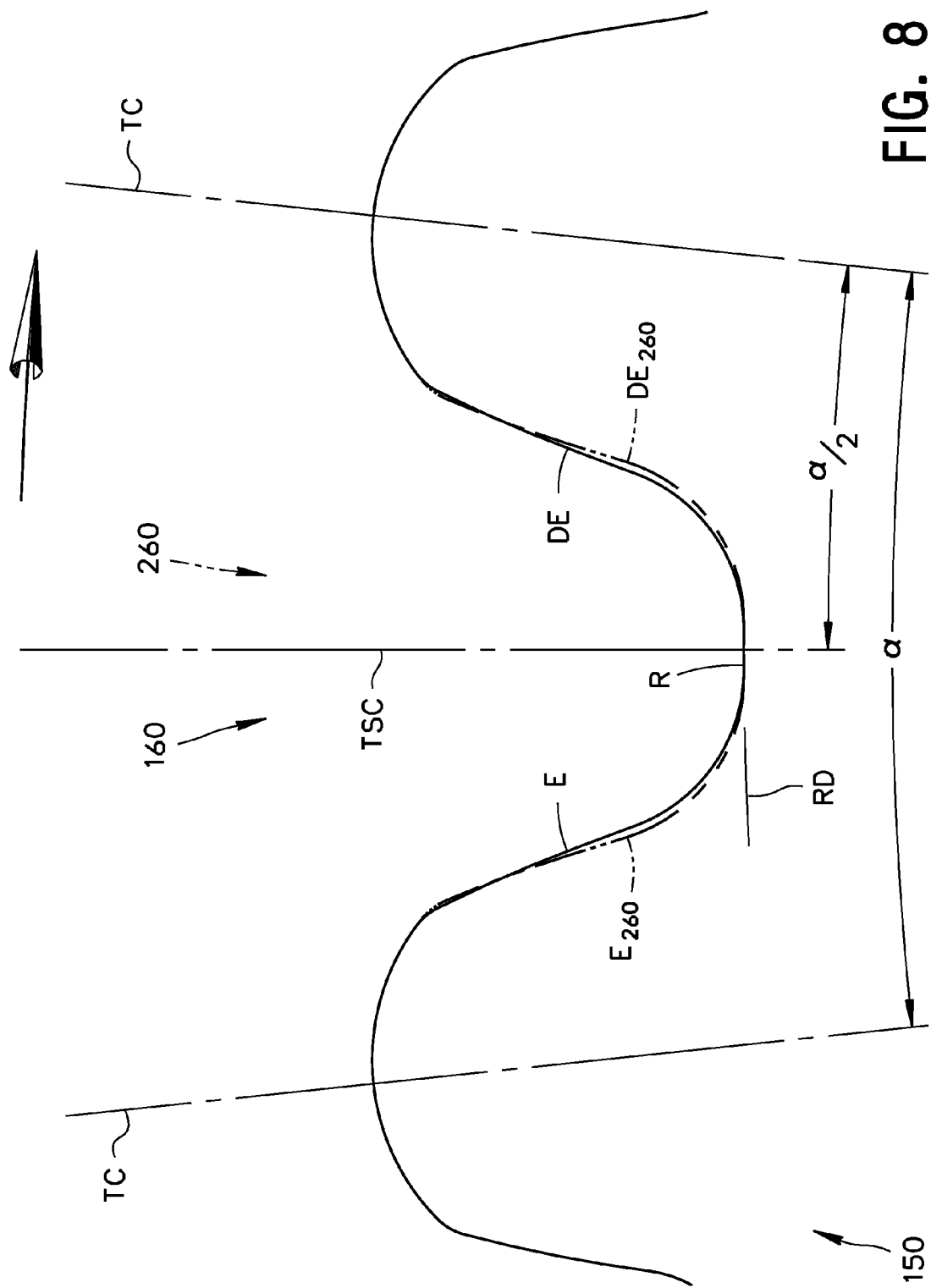
FIG. 8 is a greatly enlarged view of adjacent conventional teeth of the sprocket shown in FIG. 4 with the profile of adjacent conventional teeth formed with a reduced pressure angle shown as an overlay in phantom.
Figure 8A:
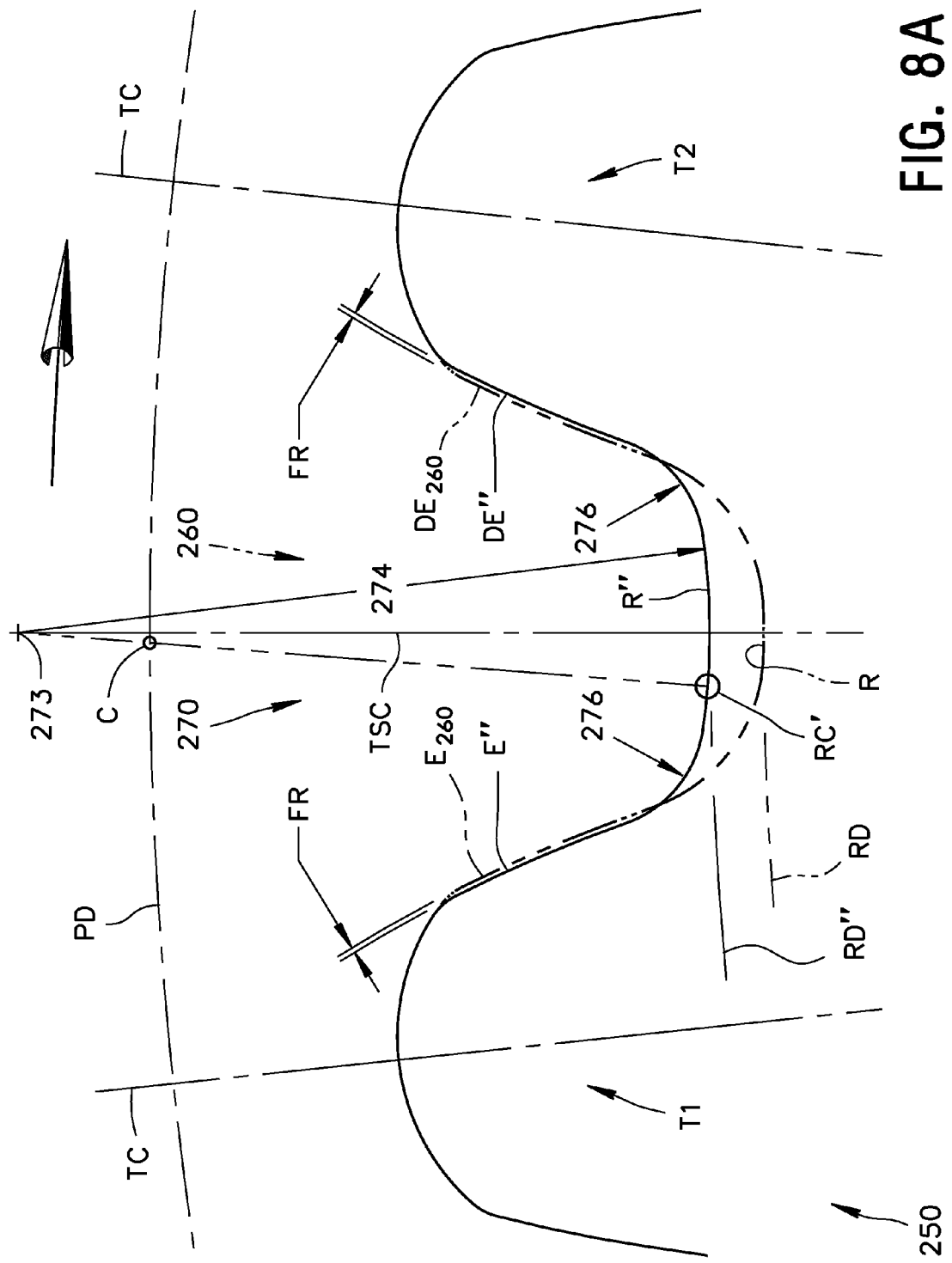
FIG. 8A is a greatly enlarged view of a flank-relieved tooth of the sprocket shown in FIG. 7, with the profile of adjacent conventional teeth used to construct the flank-relieved tooth shown as an overlay in phantom.

One method of designing the reduced pressure tooth spaces 270 is to begin with a standard tooth space 160 (shown in solid lines in FIG. 8) and reduce the pressure angle of the engaging flank E as shown in phantom lines at $E_{260}$. The result is that the engaging flank $E_{260}$ is steeper as compared to the standard engaging flank E, i.e., the engaging flank $E_{260}$ defines a smaller angle with the tooth space centerline TSC as compared to the engaging flank E. The disengaging flank of the tooth space 160 is defined as a mirror image of the reduced pressure angle engaging flank $E_{260}$ about the tooth space centerline as shown at $DE_{260}$, and both the engaging flank $E_{260}$ and disengaging flank $DE_{260}$ are made tangent to the root surface R at their respective inner ends to define a reduced pressure angle tooth space 260. Referring now also to FIG. 8A, the final flank-relieved tooth spaces 270 of the sprocket 250 are defined by relieving the engaging flank$E_{260}$ and disengaging flank $DE_{260}$ (both shown in phantom lines) of the intermediate tooth space 260 by a flank relief amount FR to construct the reduced pressure angle flank-relieved engaging flank E" and reduced pressure angle disengaging flank DE" as shown in phantom lines. As described above, engaging flank E" and disengaging flank DE" of each tooth space 270 are mirror images of each other, and the root surface R" is raised and symmetrically defined about a tooth space centerline TSC by a radius 274 centered at an arc center 273 that is located on the tooth space centerline TSC. The raised root surface defines a raised root diameter RD" and it is tangent to the inner ends of the engaging and disengaging flanks E",DE". As noted above in relation to FIG. 6C, the trailing toes 37 of a fully meshed link row will make root contact at location RC' and the trailing pin center C of the fully meshed link row will be aligned with the arc center 273 and the root contact location RC' to prevent camming action of the leading toes 37 of the meshing link row against the raised root surface R". It should be noted that in the case of a sprocket 250, the pressure angle variations just described can lead to the Type A Standard Teeth and the Type B Relieved Teeth of the sprocket 250 being asymmetrically defined about their respective tooth centers TC, even though the engaging flanks and disengaging flanks of such teeth are both non-relieved, full material flanks (for the Type A Standard Teeth) or are both relieved, negatively offset flanks (for the Type B Relieved Teeth).

The magnitude of the meshing impacts along with the associated noise levels can be reduced by reducing the meshing entrance angle β. Table 1 shows the changes (reduction) in the link plate entrance angle Beta (β) (and meshing impact angle Sigma (σ)) that can be achieved for the tooth spaces 270 as compared to the standard tooth spaces 160 and flank-relieved tooth spaces 170 (for a flank relief offset FR=0.045 mm).

TABLE 1

| | Sprocket Tooth Form | Flank Offset (FR) (mm) | Pressure Angle (°) | Beta (β) Angle (°) | Sigma (σ) Angle (°) |
|---|---|---|---|---|---|
| 160 | Standard | — | 31.0 | 13.2 | 34.8 |
| 170 | Flank-relief | 0.045 | 31.0 | 12.4 | 33.3 |
| 270 | Flank-relief | 0.045 | 30.5 | 12.1 | 32.8 |

FIG. 9 graphically illustrates the meshing dynamics of FIGS. 5A, 5B, 6A and 6B in terms of chordal motion of the meshing chain link row versus sprocket angular rotation for the system 100. FIG. 9 uses a flank relief magnitude FR of 0.045 mm. The theoretical tangent line TL represents the condition of the tangent line TL being tangent to the pitch diameter PD and is therefore shown at a location of 0 mm of meshing chordal motion. The theoretical chordal motion $CM_{THEOR}$ line represents the maximum theoretical chordal motion (rise/fall) of the chain pin centers and is shown at −0.202 mm. It can be seen that, in the system 100, the pin centers C travel along a path that deviates from the tangent line TL by a maximum of −0.073 mm at location $CM_{IC}$, which is only 36.2% of $CM_{THEOR}$. $CM_{IC}$ corresponds to the location of the meshing pin centers C relative to the tangent line TL at the instant of initial contact IC for a flank-relieved tooth. Table 2 shows the minimum and maximum values for the flank relief magnitude FR (assuming a chain 10 having a 7.7 pitch, and a 30 tooth sprocket):

TABLE 2

7.7 mm Pitch, 30 Tooth Sprocket
Theoretical (Max) Chordal Motion: 0.202 mm

| Flank Offset (mm) | IC Modulation Δθ (°) | CM at IC (mm) | % of $CM_{THEOR}$ | Full Mesh Mod. ΔΦ (°) |
|---|---|---|---|---|
| 0.0 (Conventional Tooth) | — | 0.033 | 16.4 | — |
| 0.020 | 0.5 | 0.049 | 24.3 | −0.6 |
| 0.035 | 0.9 | 0.063 | 31.2 | −1.0 |
| 0.045 | 1.2 | 0.073 | 36.2 | −1.3 |
| 0.060 | 1.6 | 0.091 | 45.1 | −1.7 |
| 0.075 | 2.0 | 0.111 | 55.0 | −2.2 |

The smallest flank-relief offset FR will be of a magnitude to modulate the initial meshing impacts by $\ominus 2 - \ominus 1 = \Delta\theta = 0.5$ degrees of sprocket rotation, and the maximum flank-relief offset will be determined as a function of limiting the chordal motion at initial meshing contact as measured from the tangent line, with the limiting value for actual chordal motion to be defined as $0.75 \times CM_{THEOR}$ where $CM_{THEOR}$ is the maximum theoretical chordal motion. It is important to note that each flank-relieved tooth can have the same amount of offset or flank-relief or, alternatively, some or all of the flank-relieved teeth can be defined with a different amount of flank-relief or offset as compared to each other provided, however, that the engaging and disengaging flanks of each tooth space 160,170 or 160,270 are symmetrically defined relative to each other.

Those of ordinary skill in the art will recognize from the foregoing that the two (or more) different tooth forms incorporated into the full complement of sprocket teeth of the sprocket in a random (irregular) or fixed pattern will serve to modulate the initial meshing impacts between the chain and sprocket teeth, and will also serve to modulate meshing impacts at the transition points. As such, the sprocket will exhibit improved noise and vibration as compared to a conventional inverted tooth sprocket. Because the tooth spaces TS are symmetrical, the sprocket can be run bi-directionally without altering its function.

The invention has been described with reference to preferred embodiments. Modifications and alterations will occur to those of ordinary skill in the art to which the invention pertains, and it is intended that the invention be construed as encompassing all such modifications and alterations.

The invention claimed is:

1. A sprocket comprising:
a body comprising a plurality of teeth defined relative to respective tooth centers, said tooth centers spaced evenly in a circumferential arrangement, each of said plurality of teeth comprising an engaging flank and a disengaging flank;
wherein each pair of circumferentially successive teeth of said plurality of teeth are separated from each other by respective tooth spaces, each of said tooth spaces defined at least partially by the engaging flank of one of said circumferentially successive teeth, the disengaging flank of the other of said circumferentially successive teeth, and a root surface that is located between the engaging flank and the disengaging flank of the tooth space;
said engaging flank of each tooth space defined as a mirror image of the disengaging flank of each tooth space relative to a radial tooth space centerline that bisects said tooth space;
wherein said plurality of teeth comprise Type A Standard Teeth, Type B Standard Teeth, Type A Relieved Teeth, and Type B Relieved Teeth, wherein:
for each of said Type A Standard Teeth, said engaging flank and said disengaging flank thereof are defined with a non-relieved full material flank;
for each of said Type B Standard Teeth, said engaging flank and said disengaging flank thereof are defined asymmetrically relative to each other about the tooth center, with said engaging flank thereof defined by a non-relieved full material flank and said disengaging flank thereof defined by a flank-relieved flank that is negatively offset relative to the tooth center as compared to said non-relieved full material flank of said disengaging flank of each of said Type A Standard Teeth;
for each of said Type A Relieved Teeth, said engaging flank and said disengaging flank thereof are defined asymmetrically relative to each other about the tooth center, with said disengaging flank thereof defined by a non-relieved full material flank and said engaging flank thereof defined with a flank-relieved flank that is negatively offset relative to the tooth center as compared to said non-relieved full material flank of said engaging flank of each of said Type A Standard Teeth;

for each of said Type B Relieved Teeth, said engaging flank and said disengaging flank thereof are each defined with a flank-relieved flank that is negatively offset relative to the tooth center as compared to said non-relieved full material flank of said engaging flank and said disengaging flank, respectively, of each of said Type A Standard Teeth.

2. The sprocket as set forth in claim 1, wherein the engaging flanks of the Type A Relieved Teeth are defined with a flank-relief pressure angle and the engaging flanks of the Type A Standard Teeth are defined with a standard pressure angle, wherein said flank-relief pressure angle is less than said standard pressure angle.

3. The sprocket as set forth in claim 1, wherein the engaging flanks of the Type B Relieved Teeth are defined with a flank-relief pressure angle and the engaging flanks of the Type B Standard Teeth are defined with a standard pressure angle, wherein said flank-relief pressure angle is less than said standard pressure angle.

4. The sprocket as set forth in claim 2, wherein a first group of said flank-relieved engaging flanks of said sprocket are negatively offset relative to their respective tooth centers by a first negative offset amount and a second group of said flank-relieved engaging flanks of said sprocket are negatively offset relative to their respective tooth centers by a second negative offset amount that is greater than said first negative offset amount.

5. The sprocket as set forth in claim 1, wherein a first group of said flank-relieved engaging flanks of said sprocket are negatively offset relative to their respective tooth centers by a first negative offset amount and a second group of said flank-relieved engaging flanks of said sprocket are negatively offset relative to their respective tooth centers by a second negative offset amount that is greater than said first negative offset amount.

6. The sprocket as set forth in claim 1, wherein the respective root surface located in each of said tooth spaces defined between an engaging flank comprising a flank-relieved profile and a disengaging flank comprising a flank-relieved profile comprises a raised root surface that is located radially outward as compared to the respective root surface located in each of said tooth spaces defined between an engaging flank comprising a non-relieved profile and a disengaging flank comprising a non-relieved profile.

7. The sprocket as set forth in claim 6, wherein each raised root surface comprises a circular arc segment defined by a radius centered at a root surface arc center that is located on the tooth space centerline.

8. The sprocket as set forth in claim 6, further comprising an inverted tooth chain meshed with the sprocket, wherein said sprocket and said inverted tooth chain meshed with said sprocket operate bidirectionally with equal meshing dynamics for clockwise and counter-clockwise rotation of said sprocket.

9. The sprocket as set forth in claim 8, wherein said inverted tooth chain comprises a plurality of rows of links each structured for inside flank engagement with the sprocket, with leading inside flanks of each row of links projecting outwardly relative to the trailing outside flanks of a preceding row of links such that the leading inside flanks of each meshing link row of said chain make inside flank contact with the engaging flank of one of said sprocket teeth.

10. The inverted tooth chain drive system as set forth in claim 9, wherein, when said inverted tooth chain fully meshes with one of said Type A Relieved Teeth or one of said Type B Relieved Teeth, said inverted tooth chain contacts said root surface located in the tooth space that precedes said one of said Type A Relieved Teeth or said one of said Type B Relieved Teeth.

11. The sprocket as set forth in claim 9, wherein:
said inverted tooth chain comprises a free span adapted to approach and mesh with said sprocket along a tangent line;
the leading inside flanks of each meshing link row of said chain from said free span make inside flank contact with the engaging flank of a sprocket tooth upon initial contact between said chain and said sprocket such that:
(i) a first initial contact angle $\theta 1$ is defined at an instant of initial contact between said chain and one of said Type A Relieved Teeth or one of said Type B Relieved Teeth;
(ii) a second initial contact angle $\theta 2$ is defined at an instant of initial contact between said chain and one of said Type A Standard Teeth or one of said Type B Standard Teeth,
with said first and second initial contact angles $\theta 1$ and $\theta 2$ defined between a first reference line and a second reference line wherein: (i) said first reference line extends through an axis of rotation of said sprocket and extends normal to said tangent line; (ii) said second reference line extends through said axis of rotation and passes through said tooth center of said tooth with which said chain is making inside flank initial contact;
wherein $\theta 2 > \theta 1$.

12. The sprocket as set forth in claim 11, wherein said flank-relieved engaging flanks of said sprocket are negatively offset relative to their respective tooth centers by a negative offset amount that is at least of a magnitude such that $\theta 2 - \theta 1 \geq 0.5$ degrees.

13. The sprocket as set forth in claim 12, wherein said free span of said chain exhibits actual chordal motion $CM_{IC}$ relative to said tangent line when meshing with said sprocket and wherein said flank-relieved engaging flanks of said sprocket are negatively offset relative to their respective tooth centers by a negative offset amount that is of a magnitude such that $CM_{IC} \leq 0.75 \times CM_{THEOR}$ where $CM_{THEOR}$ is the maximum theoretical chordal motion of said free span of said chain relative to said tangent line.

14. The sprocket as set forth in claim 1, wherein the engaging flank and the disengaging flank of each Type A Standard Tooth are defined symmetrically about the respective tooth center of the Type A Standard Tooth.

15. The sprocket as set forth in claim 1, wherein the engaging flank and the disengaging flank of each Type B Relieved Tooth are defined symmetrically about the respective tooth center of the Type B Relieved Tooth.

16. An inverted tooth chain drive system comprising:
a sprocket;
an inside flank engagement inverted tooth chain meshed with the sprocket;
said sprocket including a plurality of teeth defined relative to respective tooth centers that are spaced evenly in a circumferential arrangement about an axis of rotation of the sprocket, each of said teeth comprising an engaging flank and a disengaging flank;
said inverted tooth chain including a plurality of rows of links each structured for inside flank engagement with the sprocket teeth, with leading inside flanks of each row of links projecting outwardly relative to trailing outside flanks of a preceding row of links when the chain approaches the sprocket such that the leading inside flanks of each row are positioned to make initial meshing contact with the engaging flank of one of the sprocket teeth, at least some of the sprocket teeth are standard teeth and other teeth are flank-relieved teeth, wherein each of said standard teeth comprises full material engaging flanks and each of said flank-relieved teeth comprises relieved engaging flanks that are negatively offset toward the respective tooth center;

tooth spaces defined between every pair of circumferentially successive teeth of said plurality of teeth, each tooth space comprising the engaging flank of a first tooth, the disengaging flank of a second tooth, and a root surface preceding the engaging flank of the first tooth and located between the engaging flank of the first tooth and the disengaging flank of the second tooth, wherein:

the engaging flank of the first tooth and the disengaging flank of the second tooth for every tooth space of said sprocket are symmetrically defined about a tooth space centerline; and, the root surface preceding each flank-relieved tooth is located radially outward as compared the root surface preceding each standard tooth.

* * * * *